United States Patent
Pfaendner et al.

(10) Patent No.: US 11,591,450 B2
(45) Date of Patent: Feb. 28, 2023

(54) METHOD FOR STABILIZING HALOGEN-FREE THERMOPLASTIC RECYCLATES, STABILIZED PLASTIC COMPOSITIONS, AND MOLDING COMPOUNDS AND MOLDED PARTS PRODUCED THEREFROM

(71) Applicant: FRAUNHOFER-GESELLSCHAFT ZUR FÖRDERUNG DER ANGEWANDTEN FORSCHUNG E. V., Munich (DE)

(72) Inventors: Rudolf Pfaendner, Rimbach (DE); Elke Metzsch-Zilligen, Steffeln (DE)

(73) Assignee: FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

(21) Appl. No.: 16/649,656

(22) PCT Filed: Sep. 25, 2018

(86) PCT No.: PCT/EP2018/075971
§ 371 (c)(1),
(2) Date: Mar. 22, 2020

(87) PCT Pub. No.: WO2019/063550
PCT Pub. Date: Apr. 4, 2019

(65) Prior Publication Data
US 2020/0317886 A1    Oct. 8, 2020

(30) Foreign Application Priority Data
Sep. 28, 2017 (DE) ................. 10 2017 217 312.2

(51) Int. Cl.
*C08K 5/053* (2006.01)
(52) U.S. Cl.
CPC ........ *C08K 5/053* (2013.01); *C08K 2201/014* (2013.01)
(58) Field of Classification Search
CPC ........ C08K 5/053; C08K 5/005; C08K 5/524; C08K 5/53; C08K 5/372; C08K 2201/014; C08L 23/06; C08L 23/12; C08L 2201/0822; C08L 2207/20; C08J 11/24
See application file for complete search history.

(56) References Cited

U.S. PATENT DOCUMENTS

| | | | |
|---|---|---|---|
| 5,594,055 A | 1/1997 | Young | |
| 5,789,470 A | 8/1998 | Herbst et al. | |
| 6,251,972 B1 | 6/2001 | Hoffmann et al. | |
| 6,298,540 B1 | 10/2001 | Benjey et al. | |
| 6,525,158 B1 | 2/2003 | Hoffmann et al. | |
| 6,673,856 B1 | 1/2004 | Mentink | |
| 10,138,354 B2 | 11/2018 | Pfaendner et al. | |
| 10,214,631 B2 | 2/2019 | Pfaendner et al. | |
| 10,323,136 B2 | 6/2019 | Pfaendner et al. | |
| 10,364,340 B2 | 7/2019 | Pfaendner et al. | |
| 10,370,537 B2 | 8/2019 | Pfaendner et al. | |
| 10,450,442 B2 | 10/2019 | Pfaendner et al. | |
| 10,544,284 B2 | 1/2020 | Pfaendner et al. | |
| 10,781,296 B2 | 9/2020 | Groos et al. | |
| 10,917,742 B2 | 2/2021 | Pfaendner et al. | |
| 2007/0246685 A1 | 10/2007 | Wyart et al. | |
| 2010/0189595 A1* | 7/2010 | Webster | B01J 20/10 422/4 |
| 2013/0018130 A1* | 1/2013 | Alidedeoglu | C08L 67/02 524/47 |
| 2013/0041086 A1 | 2/2013 | Kimura et al. | |
| 2014/0278142 A1 | 9/2014 | Danes et al. | |

(Continued)

FOREIGN PATENT DOCUMENTS

| | | |
|---|---|---|
| CN | 1084529 A | 3/1994 |
| CN | 104311749 A | 1/2015 |

(Continued)

OTHER PUBLICATIONS

Kartalis et al.; Polymer Degradation and Stability, 2000, vol. 70, p. 189-197.*
Li et al.; Journal of Applied Polymer Science, 2001, vol. 82, p. 611-619.*
Pfaendner, "Improving the Quality of Recycled Materials," *Kunststoffe International* Dec. 2015: 41-44 (2015).
Steenwijk et al., "The effect of (natural) polyols on the initial colour of heavy metal- and zinc-free poly(vinyl chloride)," *Polymer Degradation and Stability* 91(9): 2233-2240 (2006).
Wirth et al., "The stabilization of PVC against heat and light," *Pure and Applied Chemistry* 49(5): 627-648 (1977).
German Patent Office, First Office Action in German Patent Application No. 10 2017 217 312.2 (dated Nov. 8, 2017).

(Continued)

*Primary Examiner* — Robert S Jones, Jr.
(74) *Attorney, Agent, or Firm* — Leydig, Voit & Mayer, Ltd.

(57) ABSTRACT

The invention relates to a method for stabilizing halogen-free thermoplastic recyclates or pre-damaged plastics against oxidative, thermal, and/or actinic degradation. In the method according to the invention, at least one alditol or cyclitol is introduced into a halogen-free thermoplastic recyclate as a component, and optionally in addition thereto, at least one primary antioxidant and/or at least one secondary antioxidant is introduced into a halogen-free thermoplastic recyclate. By virtue of the method according to the invention, plastic recyclates can be stabilized against oxidative, thermal, and/or actinic degradation with a high degree of effectiveness and in a very environmentally friendly and inexpensive manner. The invention additionally relates to corresponding recyclate-based plastic compositions, to molding compound and molded parts produced therefrom, to stabilizer compositions, and to the use thereof for stabilizing halogen-free thermoplastic recyclates against oxidative, thermal, and/or actinic degradation.

19 Claims, No Drawings

(56) References Cited

U.S. PATENT DOCUMENTS

| | | | |
|---|---|---|---|
| 2016/0052927 A1 | 2/2016 | Pfaendner et al. | |
| 2016/0136853 A1* | 5/2016 | Dinunzio | C08K 3/26 |
| | | | 523/102 |
| 2016/0272789 A1 | 9/2016 | Pfaendner et al. | |
| 2017/0107375 A1 | 4/2017 | Pfaendner et al. | |
| 2017/0121499 A1 | 5/2017 | Pfaendner et al. | |
| 2017/0121536 A1 | 5/2017 | Marauska et al. | |
| 2017/0260362 A1 | 9/2017 | Pfaendner et al. | |
| 2017/0260363 A1 | 9/2017 | Pfaendner et al. | |
| 2017/0260366 A1 | 9/2017 | Pfaendner et al. | |
| 2017/0267835 A1 | 9/2017 | Groos et al. | |
| 2018/0186970 A1 | 7/2018 | Groos et al. | |
| 2019/0248927 A1 | 8/2019 | Klein et al. | |
| 2020/0231783 A1 | 7/2020 | Pfaendner et al. | |
| 2020/0317886 A1 | 10/2020 | Pfaendner et al. | |
| 2020/0361879 A1 | 11/2020 | Fischer et al. | |
| 2021/0130582 A1 | 5/2021 | Ciesielski et al. | |

FOREIGN PATENT DOCUMENTS

| | | | |
|---|---|---|---|
| DE | 288161 A5 | 3/1991 | |
| EP | 0 470 048 A2 | 2/1992 | |
| EP | 0 506 614 A2 | 9/1992 | |
| EP | 0 702 704 B1 | 2/1998 | |
| EP | 0 662 101 B1 | 5/2009 | |
| JP | H10-202720 A | 8/1998 | |
| JP | 2001-506301 A | 5/2001 | |
| JP | 2002-069314 A | 3/2002 | |
| JP | 2011-032461 A | 2/2011 | |
| JP | 2011-236401 A | 11/2011 | |
| JP | 2011219591 A * | 11/2011 | C08K 5/053 |
| JP | 2014-520933 A | 8/2014 | |
| JP | 2014-524958 A | 9/2014 | |
| WO | WO 94/07946 A1 | 4/1994 | |
| WO | WO 97/30112 A1 | 8/1997 | |
| WO | WO 2013/012705 A1 | 1/2013 | |
| WO | WO 2017/073623 A1 | 5/2017 | |

OTHER PUBLICATIONS

German Patent Office, Second Office Action in German Patent Application No. 10 2017 217 312.2 (dated Sep. 20, 2019).
European Patent Office, International Search Report in International Application No. PCT/EP2018/075971 (dated Nov. 22, 2018).
European Patent Office, Written Opinion in International Application No. PCT/EP2018/075971 (dated Nov. 22, 2018).
International Bureau of WIPO, International Preliminary Report on Patentability in International Application No. PCT/EP2018/075971 (dated Mar. 31, 2020).
U.S. Appl. No. 16/633,645, filed Jan. 24, 220.
Intellectual Property India, First Examination Report in Indian Patent Application No. 202017012952 (dated Jan. 29, 2021).
Craig et al., "Mechanical properties of photo-degraded recycled photo-degraded polyolefins," *J. Mater. Sci.* 41(3): 993-1006 (2006).
Iida et al., "Stabilization of poly(vinyl chloride). V. Synergism between metal soaps and polyols upon stabilization of poly(vinyl chloride)," *J. Appl. Polym. Sci.* 25(5): 887-900 (1980).
Maxwell, "Weathering of recycled photo-degraded polyethylene," *Polym. Eng. Sci.* 48(2): 381-385 (2008).
Pfaendner et al., "Recycling and restabilization of polymers for high quality applications. An Overview," *Die Angew. Macromol. Chemie* 232(1): 193-227 (1995).
Pospisil et al., "Chain-breaking stabilizers in polymers: the current status," *Polymer Degradation and Stability* 49(1): 99-110 (1995).
Richaud et al., "Polyethylene stabilization against thermal oxidation by a trimethylquinoleine oligomer," *Polymer Degradation and Stability* 94(3): 410-420 (2009).
U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,445, filed Mar. 15, 2017.
U.S. Appl. No. 15/511,471, filed Mar. 15, 2017.
U.S. Appl. No. 15/529,026, filed May 23, 2017.
U.S. Appl. No. 15/738,515, filed Dec. 20, 2017.
U.S. Appl. No. 16/344,830, filed Apr. 25, 2019.
U.S. Appl. No. 16/488,902, filed Aug. 26, 2019.
U.S. Appl. No. 16/633,645, filed Jan. 24, 2020.
U.S. Appl. No. 16/649,656, filed Mar. 22, 2020.
U.S. Appl. No. 16/764,291, filed May 14, 2020.
U.S. Appl. No. 17/243,800, filed Jul. 16, 2021.
U.S. Appl. No. 17/287,079, filed Apr. 20, 2021.
U.S. Appl. No. 17/425,267, filed Jul. 22, 2021.
Curtzwiler et al., "Certification markers for empirical quantification of post-consumer recycled content in extruded polyethylene film," *Polymer Testing* 65: 103-110 (2018).
Hinsken et al., "Degradation of Polyolefins during Melt Processing," *Polymer Degradation and Stability* 34: 279-293 (1991).
Jansson et al., "Chemical degradation of a polypropylene material exposed to simulated recycling," *Polymer Degradation and Stability* 84: 227-232 (2004).
La Mantia, "The Role of Additives in the Recycling of Polymers," *Macromol. Symp.* 135: 157-165 (1998).
Mansor et al., "Thermal and Mechanical Behaviour of Recycled Polypropylene/Polyethylene Blends of Rejected-Unused Disposable Diapers," *Journal of Advanced Manufacturing Technology* 13(3): (2019)—12 pgs.
Pospíšil et al., "The Origin and Role of Structural Inhomogeneities and Impurities in Material Recycling of Plastics," *Macromol. Symp.* 135: 247-263 (1998).
Pospíšil et al., "Upgrading of recycled plastics by restabilization— an overview," *Polymer Degradation and Stability* 48: 351-358 (1995).
Romão et al., "Distinguishing between virgin and post-consumption bottle-grade poly (ethylene terephthalate) using thermal properties," *Polymer Testing* 29: 879-885 (2010).
Stangenberg et al., "Quality Assessments of Recycled Plastics by Spectroscopy and Chromatography," *Chromatographia* 59: 101-106 (2004).
Verordnung (EG) Nr. 282/2008 Der Kommission vom 27. Mar. 2008 über Materialien und Gegenstände aus recyceltem Kunststoff, die dazu bestimmt sind, mit Lebensmitteln in Berührung zu kommen, und zur Änderung der Verordnung (EG) Nr. 2023/2006 (Text von Bedeutung für den EWR) Amtsblatt der Europäischen Union, Mar. 2008, 10 pgs. Commission Regulation (EC) No. 282/2008 dated Mar. 27, 2008 on materials and objects made from recycled plastic that are intended to come into contact with food and amending Regulation (EC) No. 2023/2006 (Text with EEA relevance), Official Journal of the European Union, Mar. 2008, 10 pgs.—Summary translation downloaded from *Recycled plastic packaging in contact with food* (europa.eu).
China National Intellectual Property Administration, First Office Action in Chinese Patent Application No. 2018800632351 (dated Apr. 25, 2022).
National Institute of Industrial Property, Preliminary Office Action and Search Report in Brazilian Patent Application No. BR112020006015 (dated Jul. 13, 2022).
European Patent Office, Notification under Article 94 (3) EPC in European Patent Application No. 18 782 901.5 (dated Aug. 29, 2022).
Japan Patent Office, Notification of Reasons for Refusal in Japanese Patent Application No. 2020-517918 (dated Jun. 28, 2022).
China National Intellectual Property Administration, Second Office Action in Chinese Patent Application No. 2018800632351 (dated Nov. 11, 2022).
Japan Patent Office, Notification of Reasons for Refusal in Japanese Patent Application No. 2020-517918 (dated Dec. 6, 2022).

* cited by examiner

METHOD FOR STABILIZING HALOGEN-FREE THERMOPLASTIC RECYCLATES, STABILIZED PLASTIC COMPOSITIONS, AND MOLDING COMPOUNDS AND MOLDED PARTS PRODUCED THEREFROM

CROSS-REFERENCE TO RELATED APPLICATIONS

This patent application is the U.S. national phase of International Application No. PCT/EP2018/075971, filed on Sep. 25, 2018, which claims the benefit of German Patent Application No. 10 2017 217 312.2, filed Sep. 28, 2017, the disclosures of which are incorporated herein by reference in their entireties for all purposes.

The present invention relates to a method for stabilizing halogen-free thermoplastic recyclates or pre-damaged plastics against oxidative, thermal, and/or actinic degradation. In the method in accordance with the invention, at least one alditol or cyclitol is introduced into a halogen-free thermoplastic recyclate as a component, and optionally in addition thereto, at least one primary antioxidant and/or at least one secondary antioxidant is introduced into a halogen-free thermoplastic recyclate. Plastic recyclates can be stabilized against oxidative, thermal, and/or actinic degradation with a high degree of effectiveness and in a very environmentally friendly and inexpensive manner by the method in accordance with the invention. The present invention additionally also relates to corresponding recyclate-based plastic compositions and to molding compounds and molded parts produced therefrom. The present invention furthermore also relates to stabilizer compositions, and to the use thereof for stabilizing halogen-free thermoplastic recyclates against oxidative, thermal, and/or actinic degradation Plastic recyclates are a growing market and an important element in recycling management of natural resources, with recyclates then ideally being intended to replace new plastics by an identical or at least comparable property profile. However, irreversible changes in the polymer chain due to mechanochemical, chemical, or light-induced processes (see e.g. R. Pfaendner et al., Angew. Makromol. Chemie 1995, 232, 193-227; J. Pospisil et al., Pol. Degr. Stab. 1995) occur with recyclates from production or from old plastics during the first processing steps (e.g. compounding, injection molding). New chemical groups are produced in the polymer chain and/or the composition of the polymer is changed by radical reactions in the presence of oxygen. The concentration of these newly formed groups increases with the length of use and the area of use (UV light, high temperatures, contact media). The structural inhomogeneities of a recyclate influence the plastic properties such as the mechanical properties.

It furthermore applies that recyclates or pre-damaged plastics are more oxidation-sensitive than new material since degradation products act as initiator points for a further oxidation or as prodegradants (A. S. Maxwell, Pol. Eng. Sci. 2008, 381-385; I. H. Craig, J. R. White, J. Mater. Sci. 2006, 41, 993-1006). Post-stabilization with selected stabilizers is an important method to achieve a quality improvement of plastic recyclates. The stabilizers used protect the recyclate from further oxidative (or photo-oxidative) damage. The optimized stabilizer composition for a recyclate, however, differs due to the described structural deviations from the stabilization composition of the new product (see e.g. R. Pfaendner, Kunststoffe International 12/2015, 41-44).

Due to the differences now recognized between new plastic products and plastic recyclates, special recyclate stabilizer compositions have become known and are also available as commercial products (e.g. the Recyclostab series of PolyAd Services GmbH, Bensheim). Known technical stabilization solutions that take account of the demands of recyclates are, for example:

Stabilization composition consisting of a phenolic antioxidant, a phosphite, and a fatty acid salt (EP 0662101).

Stabilization composition consisting of a phenolic antioxidant, a phosphite, and a metal oxide such as calcium oxide (U.S. Pat. Nos. 6,525,158, 6,251,972).

Stabilization composition consisting of a phenolic antioxidant and a polyfunctional epoxide (EP 0702704).

Stabilization by a macrocyclic piperidine (U.S. Pat. No. 5,789,470).

Stabilization composition consisting of a secondary aromatic amine and a polyfunctional epoxide (WO 97/30112).

Discoloration of damaged polyolefins by a hydroxylamine (EP 470048).

Mixture of antioxidants, mold lubricants, anti-blocking agents, UV stabilizers, and antistatic agents for recyclate films (DD 288161).

Stabilization composition for mixed plastics consisting of a phenolic antioxidant and a phosphite/phosphonite (EP 0506614).

Despite the known solutions, there is still a need for particularly high performance or effective, environmentally friendly, and inexpensive options for stabilizing plastic recyclates or stabilizer compositions usable therefor.

Recyclates have here already run through a life cycle and had already been compounded to form molded plastic parts and are as such exposed to mechanical, chemical, actinic, and/or oxidative loads. Specific defects hereby result in the polymer chain that effect further, disproportionate damage to the underlying plastic material on a repeat processing of the recyclates. The damage points present in the polymer here serve as initiator points for an accelerated and expanded degradation of the polymer. A lowering of the molecular weight, a broadening of the molecular weight distribution, a reduction in the mechanical properties, and an increase in the light sensitivity are in particular typical phenomena that occur with recycled plastics, in particular on their repeat processing. The property profile that has worsened overall is thus more disadvantageous for a repeat processing.

Starting from this, it was thus the object of the present invention to provide a method for stabilizing halogen-free thermoplastic recyclates by which the plastic recyclates can be stabilized against oxidative, thermal, and/or actinic degradation in a very effective, environmentally friendly and inexpensive manner.

This object is achieved with respect to a method for stabilizing halogen-free thermoplastic recyclates described herein, with respect to a plastic composition described herein, with respect to a molding compound or a molded part that can be manufactured from the plastic composition described herein, with respect to a stabilizer composition described herein, and with respect to the use of the stabilizer compositions described herein, and the advantageous developments thereof.

In accordance with the invention, a method for stabilizing halogen-free thermoplastic recyclates against oxidative, thermal, and/or actinic degradation is thus provided in which method at least one alditol or cyclitol (also called "components (A)" in the following) is introduced into a halogen-free thermoplastic recyclate.

Since the thermoplastics forming the basis of the plastic recyclates had as a rule already had primary and/or secondary antioxidants added to them on their manufacture, it is therefore not absolutely necessary in the reprocessing of consumed or already used plastics, that is recyclates, again primary and/or secondary antioxidants in the reprocessing of these recyclates. It has surprisingly been found that it is sufficient to work at least one alditol or cyclitol into the plastic recyclates to achieve a stabilizing effect that is particularly high in a synergetic manner in the presence of primary and/or secondary oxidants.

In accordance with the present invention, a plastic recyclate is understood as a recycled plastic in accordance with the definition of the term as per the standard DIN EN 15347:2007. There are furthermore relevant international standards for many kinds of plastic recyclates. DIN EN 15353:2007 is, for example, relevant to PET plastic recyclates. PS recyclates are described in detail in DIN EN 15342:2008. PE recyclates are treated in DIN EN 15344: 2008. PP recyclates are characterized in DIN EN 15345: 2008. For the purposes of the corresponding specific plastic recyclates, the present patent application incorporates the definitions of these international standards.

Unlike new plastics, plastic recyclates usually have pre-damage, i.e. new chemical groups are produced on the polymer chain by oxidative or (photo)oxidative processes. With polyolefins, they are e.g. mainly carbonyl groups that are not present or are only present to a highly subordinate degree with new products. The concentration of the carbonyl groups is therefore simultaneously a measure for the pre-damage of the polymer. The concentration of carbonyl groups can be determined in accordance with known analytical methods such as infrared spectroscopy, such as is described in E. Richaud et al. Pol. Degr. Stab. 2009, 94, 410-420. A measurement of the absorption of the carbonyl oscillation in the range of 1720 $cm^{-1}$ takes place here.

"Halogen-free" is to be understood in accordance with the invention such that the thermoplastic contains less than 1% of halogenated polymers such as PVC or PVDC. The halogen-free thermoplastic preferably contains less than 0.5%, particularly preferably less than 0.1%, halogenated polymers. The halogen-free thermoplastic very particularly preferably does not contain any halogenated polymers at all.

A preferred embodiment of the method provides that in addition to the at least one alditol and/or at least one cyclitol, at least one primary antioxidant and/or at least one secondary antioxidant is/are introduced into a halogen-free thermoplastic recyclate.

In the method in accordance with the invention, the alditol or cyclitol (component (A)) and optionally the at least one primary antioxidant and/or the at least one secondary antioxidant (component (B)) is/are introduced into a halogen-free thermoplastic recyclate. Components (A) and (B) can here be introduced into the plastic recyclate individually, i.e. separately from one another, or components (A) and (B) can be introduced into the plastic recyclate together in the form of a composition comprising components (A) and (B) or in the form of a composition consisting of components (A) and (B).

At least one primary antioxidant, or
at least one secondary antioxidant, or
at least one primary antioxidant and at least one secondary antioxidant
are used as component (B)

In the event that at least one primary antioxidant and at least one secondary antioxidant are used, they can also be introduced into the plastic recyclate individually or separately from one another or together in the form of a mixture.

Component (A) used in accordance with the invention and optionally component (B) used in addition to component (A) acts or act together as a stabilizer for the halogen-free thermoplastic recyclate, with the oxidative, thermal, and/or actinic degradation of the halogen-free thermoplastic recyclate being inhibited or prevented. In other words, the plastic is stabilized against oxidative, thermal, and/or actinic degradation by the introduction of component (A) and optionally additionally of component (B) into the halogen-free thermoplastic recyclate.

The present invention is here particularly characterized in that alditols (sugar alcohols) and/or cyclitols are used alone or together with primary and/or secondary antioxidants for stabilizing halogen-free thermoplastic recyclates.

Sugar alcohols or polyols have previously not been used for stabilizing halogen-free thermoplastic recyclates. Sugar alcohols and polyols are, in accordance with the prior art, only components in formulations for the thermal stabilization of polyvinyl chloride (PVC) and other halogenated polymers such as polyvinylidene chloride (PVDC) in compositions that comprise metal soaps as thermal stabilizers. This stabilizing effect of polyols in halogenated polymers is explained in that a chelate formation and deactivation of zinc compounds promoting the PVC degradation takes place (see H. O. Wirth, H. Andreas, Pure Appl. Chem. 1977, 49, 627-648; T. Iida, K. Goto, J. Appl. Pol. Sci. 1980, 25, 887-900) or in that a reaction is achieved therewith as a HCl captor in Zn-free PVC (see J. Steenwijk et al. Pol. Degr. Stab. 2006, 2233-2240).

However, no conclusion on the effect as a stabilizer in non-halogenated plastics or even in recyclates can be made from the known mechanisms of the effect of polyols in the thermal stabilization of non-halogenated polymers such as PVC. These known mechanisms are rather only applicable to halogenated polymers and cannot be transferred to halogen-free polymers. To this extent, it was not predictable, but is rather very surprising that it was able to be found by the present invention that alditols (sugar alcohols) and/or cyclitols can also stabilize halogen-free polymer recyclates on their own or when they are used together with primary and/or secondary antioxidants.

It was surprisingly found in accordance with the invention that a very effective stabilization of halogen-free thermoplastic recyclates against oxidative, thermal, and/or actinic degradation can be achieved by the introduction of at least one alditol and/or at least one cyclitol alone or together with at least one primary and/or at least one secondary antioxidant. Alditols or cyclitols are additionally very environmentally friendly and inexpensive compounds. Halogen-free thermoplastic recyclates can thus be stabilized against oxidative, thermal, and/or actinic degradation by the method in accordance with the invention in a very effective, environmentally friendly, and inexpensive manner.

The inventors surmise here that the alditols and/or cyclitols worked into the plastic recyclate can here react with the already present damage points (as a rule carbonyl groups) to form hemiacetals or full acetals when processing the new compounding. The damage points in the plastic are thus effectively masked and are no longer available as initiator points for a further degradation. Damage points in plastic recyclates can thus be eliminated by the method in accordance with the invention or by the additive compositions in accordance with the invention.

For this reason, the addition of an alditol or cyclitol to a plastic recyclate is alone an effective stabilizer since it can frequently be assumed that primary and secondary antioxidants present from the first application in the recycle had not been completely consumed during the use.

The halogen-free thermoplastic recyclate used in the method in accordance with the invention is preferably a polyolefin recyclate, e.g. a polypropylene recyclate or a polyethylene recyclate.

The composition in accordance with the invention is furthermore particularly suitable for stabilizing pre-damaged recyclates, in particular polyolefin recyclates whose carbonyl group content, determined by absorption in the infrared spectrum, amounts to at least 0.01 mol/kg, is preferably greater than 0.02 mol/kg, and is particularly preferably greater than 0.05 mol/kg.

In a preferred variant of the method in accordance with the invention, the at least one primary antioxidant is selected from the group comprising phenolic antioxidants, amines, lactones, and mixtures thereof.

There can, for example, be used as phenolic antioxidants:

Alkylated monophenols, such as 2,6-Di-tert-butyl-4-methyl phenol, 2-tert-butyl-4,6-dimethyl phenol, 2,6-di-tert-butyl-4-ethyl phenol, 2,6-di-tert-butyl-4-n-butylphenol, 2,6-di-tert-butyl-4-isobutyl phenol, 2,6-dicyclopentyl-4-methyl phenol, 2-(α-methyl cyclohexyl)-4,6-dimethyl phenol, 2,6-dioctadecyl-4-methyl phenol, 2,4,6-tricyclohexylphenol, 2,6-di-tert-butyl methoxymethyl phenol, linear or branched nonylphenols such as 2,6-dinonyl-4-methyl phenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof;

alkylthio methyl phenols such as 2,4-dioctylthiomethyl-6-tert-butylphenol, 2,4-dioctylthiomethyl-6-methyl phenol, 2,4-dioctylthiomethyl-6-ethyl phenol, 2,6-didodecylthiomethyl-4-nonylphenol;

hydroquinones and alkylated hydroquinones such as 2,6-di-tert-butyl-4-methoxyphenol, 2,5-di-tert-butylhydroquinone, 2,5-di-tert-amyl hydroquinone, 2,6-diphenyl-4-octadecyloxyphenol, 2,6-di-tert-butylhydroquinone, 2,5-di-tert-butyl-4-hydroxy anisole, 3,5-di-tert-butyl-4-hydroxy anisole, 3,5-di-tert-butyl-4-hydroxyphenyl stearate, bis(3,5-di-tert-butyl-4-hydroxyphenyl)adipate;

tocopherols such as α-, β-, γ-, δ-tocopherol and mixtures thereof (vitamin E);

hydroxylated thiodiphenylether such as 2,2'-thiobis(6-tert-butyl-4-methyl phenol), 2,2'-thiobis(4-octyl phenol), 4,4'-thiobis(6-tert-butyl-3-methyl phenol), 4,4'-thiobis(6-tert-butyl-2-methyl phenol), 4,4'-thiobis(3,6-di-sec-amylphenol), 4,4'-bis(2,6-dimethyl-4-hydroxyphenyl)disulfide;

alkylidene bisphenols such as 2,2'methylenebis(6-tert-butyl-4-methyl phenol), 2,2'-methylenebis(6-tert-butyl-4-ethyl phenol), 2,2'-methylenebis[4-methyl-6-(α-methyl cyclohexyl)phenol], 2,2'-methylenebis(4-methyl-6-cyclohexylphenol), 2,2'-methylenebis(6-nonyl-4-methyl phenol), 2,2'-methylenebis(4,6-di-tert-butylphenol), 2,2'-ethylidenebis(4,6-di-tert-butylphenol), 2,2'-ethylidenebis(6-tert-butyl-4-isobutyl phenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol, 4,4'-methylenebis(6-tert-butyl-2-methyl phenol), 1,1-bis(5-tert-butyl-4-hydroxy-2-methylphenyl)butane, 2,6-bis(3-tert-butyl-5-methyl-2-hydroxybenzyl)-4-methyl phenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethyleneglycol-bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl hydroxy-2-methylphenyl)pentane;

O-, N- and S-benzyl compounds such as 3,5,3',5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate;

hydroxybenzylated malonates such as dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate;

aromatic hydroxybenzyl compounds such as 1,3,5-tris(3,5-di-tert-butyl-4-hydroxybenzyl)-2,4,6-trimethyl benzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

triazine compounds such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate;

benzylphosphonates such as dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethylester of the 3,5-Di-tert-butyl-4-hydroxybenzylphosphonic acid;

acylaminophenols such as 4-hydroxylauranilide, 4-hydroxystearanilide, octyl-N-(3,5-di-tert-butyl-4-hydroxyphenyl)carbamate;

esters of the β-(3,5-Di-tert-butyl-4-hydroxyphenyl)propionic acid with monovalent or polyvalent alcohols, e.g. methanol, ethanol, n-octanol, i-octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of the β-(5-tert-butyl-4-hydroxy-3-methylphenyl)propionic acid with monovalent or polyvalent alcohols such as methanol, ethanol, n-octanol, i-octanol, octadecanol, 1,6-hexanediol, 1,9-nonanediol, ethylene glycol, 1,2-propanediol, neopentyl glycol, thio diethylene glycol, diethylene glycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo

[2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]undecane;

esters of the β-(3,5-dicyclohexyl-4-hydroxyphenyl)propionic acid with monovalent or polyvalent alcohols such as methanol, ethanol, octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of the (3,5-di-tert-butyl-4-hydroxyphenylacetic acid with monovalent or polyvalent alcohols, e.g. methanol, ethanol, octanol, octadecanol, 1,6-hexanediol, 1,9-nonanediol, ethylene glycol, 1,2-propanediol, neopentyl glycol, thio diethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of the β-(3,5-di-tert-butyl-4-hydroxyphenyl)propionic acid such as N,N'-bis(3,5-di-tert-butyl-4-hydroxyphenylpropionyl)hexamethylene diamide, N,N'-bis(3,5-di-tert-butyl hydroxyphenylpropionyl)hexa methylene diamide, N,N'-bis(3,5-di-tert-butyl hydroxyphenylpropionyl)hexamethylene diamide, N,N'-bis(3,5-di-tert-butyl hydroxyphenylpropionyl)hydrazide, N, N'-bis[2-(3-[3,5-di-tert-butyl hydroxyphenyl]propionyloxy)ethyl]oxamide (Naugard®XL-1, marketed by Addivant);

ascorbic acid (vitamin C).

Particularly preferred phenolic antioxidants are the following structures:

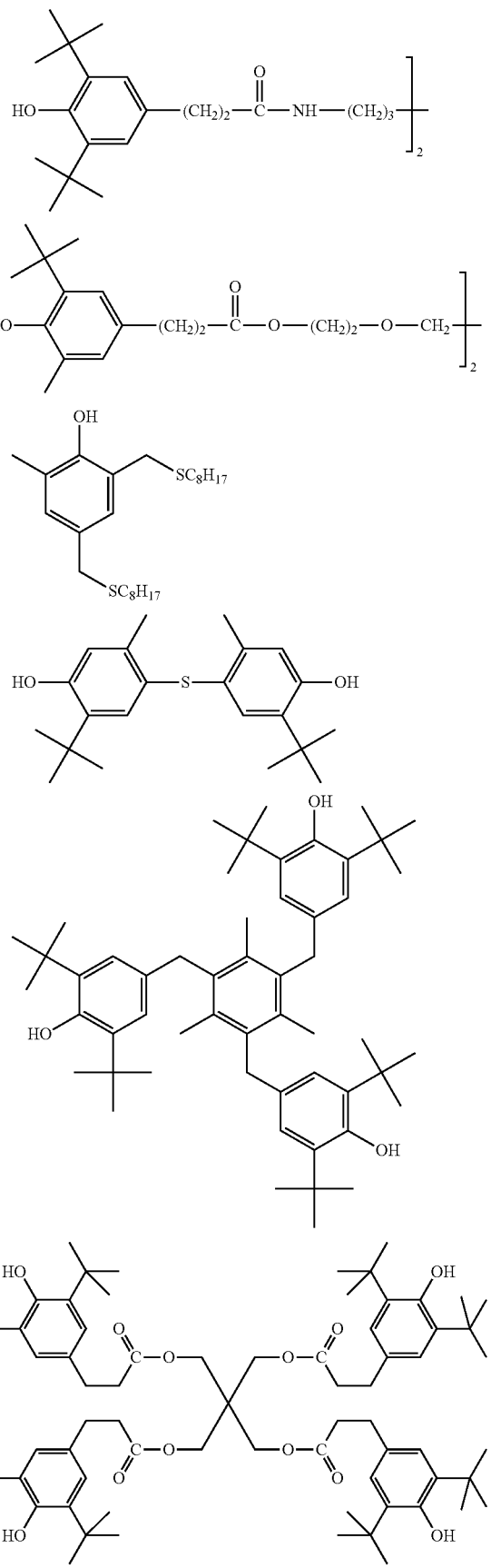

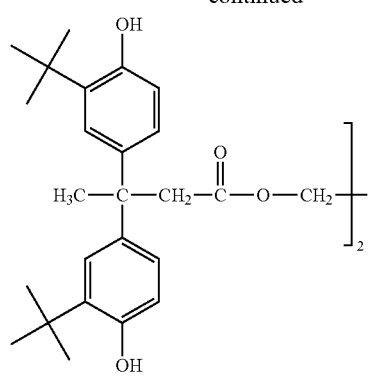
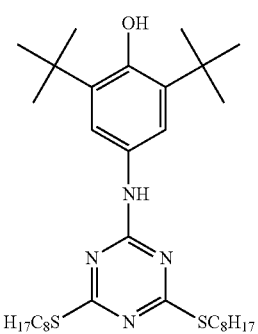
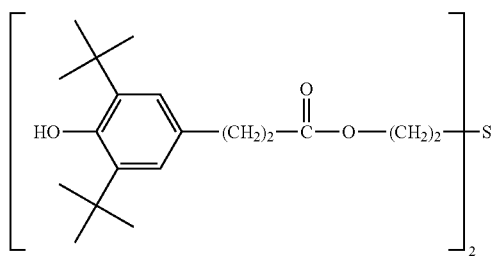
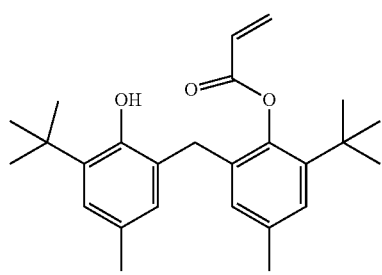
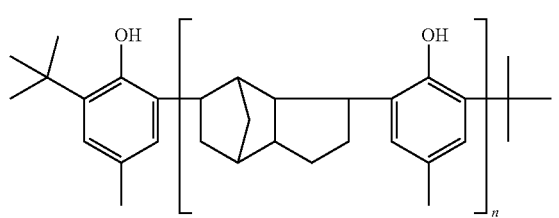
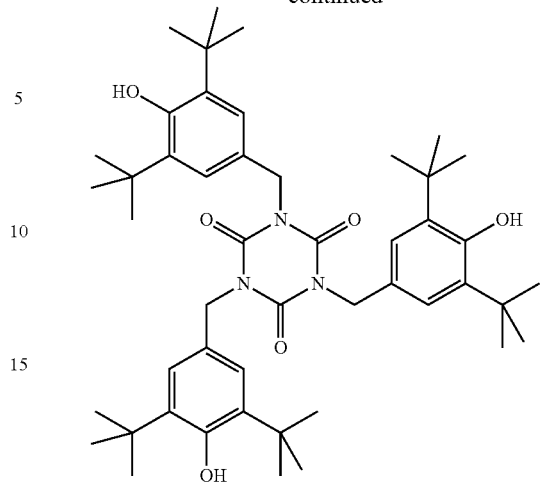
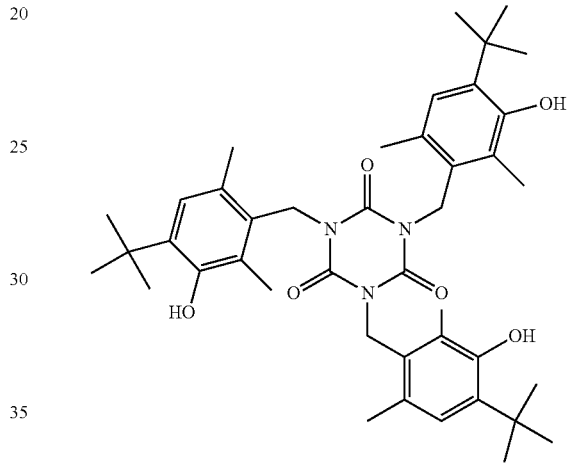
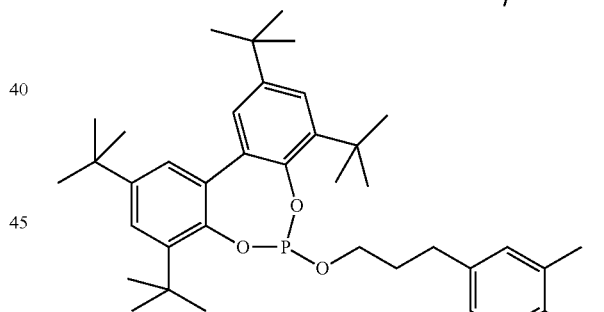
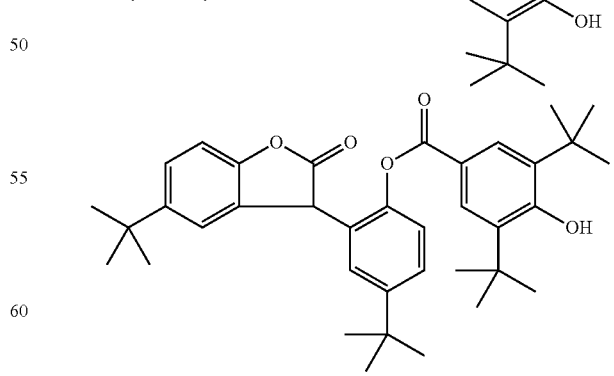
Further preferred phenolic antioxidants are phenolic antioxidants based on sustainable raw materials such as tocopherols (vitamin E), tocotrienols, tocomonoenols, carotenoids, hydroxytyrosol, flavonols such as chrysin, quercetin, hesperidin, neohesperidin, naringin, morin, camphor oil, fisetin, anthocyanins such as delphinidin and malvidin, curcumin, carnosic acid, carnosol, rosemarinic acid, tannin, and resveratrol.

The phenolic antioxidant pentaerythritol-tetrakis[3-(3,5-di-tert-butyl hydroxyphenyl)propionate or octadecyl 3-(3,5-di-tert-butyl-4-hydroxyphenyl)propionate is very particularly preferably used as the primary antioxidant.

There can, for example, be used as aminic antioxidants: N,N'-di-isopropyl-p-phenylene diamine, N,N'-di-sec-butyl-p-phenylene diamine, N,N'-bis(1,4-di methylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene-diamine, N-(1-methylheptyl)-N'-phenyl-p-phenylene diamin, N-cyclohexyl-N'-phenyl-p-phenylene diamine, 4-(p-toluolsulfamoyl)diphenylamine, N,N'-dimethyl-N,N'-di-sec-butyl-p-phenylene diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylamino-phenol, bis(4-methoxyphenyl)amine, 2,6-di-tert-butyl-4-dimethylaminomethyl-phenol, 2,4'-diaminodiphenylmethane, 4,4'-diaminodiphenylmethane, N,N,N',N'-tetra-methyl-4,4'-diaminodiphenylmethane, 1,2-bis[(2-methyl-phenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of monoalkylated and dialkylated tert-butyl/tert-octyldiphenylamines, a mixture of monoalkylated and dialkylated nonyldiphenylamines, a mixture of monoalkylated and dialkylated dodecyldiphenylamines, a mixture of monoalkylated and dialkylated isopropyl/isohexyl-diphenylamines, a mixture of monoalkylated and dialkylated tert-butyldiphenylamines, 2,3-dihydro-3,3-dimethyl-4H-1,4-benzothiazine, phenothiazine, a mixture of monoalkylated and dialkylated tert-butyl/tert-octylphenothiazines, a mixture of monoalkylated and dialkylated tert-octylphenothiazines, N-allylphenothiazine, N,N,N',N'-tetraphenyl-1,4-diaminobut-2-ene and mixtures or combinations hereof.

Preferred aminic antioxidants include:
N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene-diamine, N-(1-methylheptyl)-N'-phenyl-p-phenylene diamine, N-cyclohexyl-N'-phenyl-p-phenylene diamine.

Further preferred aminic antioxidants are:
Hydroxylamines or N-oxides (nitrons) such as N,N-dialkylhydroxylamines, N,N-dibenzylhydroxylamine, N,N-dilaurylhydroxylamine, N,N-distearylhydroxylamine, N-benzyl-α-phenylnitron, N-octadecyl-α-hexadecylnitron, and Genox EP (marketed by Addivant) in accordance with the formula:

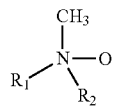

$R_1, R_2 = C_{14}\text{-}C_{24}$ alkyl

Genox EP

Preferred lactones are:

Benzofuranones and indolinones such as 3-(4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-(2-hydroxyethoxy]phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

A further preferred variant of the method in accordance with the invention is characterized in that the at least one secondary antioxidant is selected from the group comprising phosphorus compounds, in particular phosphites and phosphonites, organo-sulfur compounds, in particular sulfides and disulfides, and mixtures thereof.

There can, for example, be used as phosphites or phosphonites:

triphenylphosphite, diphenylalkylphosphites, phenyldialkylphosphites, tri(nonylphenyl)phosphite, trilaurylphosphites, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris(tert-butylphenyl)pentaerythritoldiphosphite, tristearyl-sorbitoltriphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyl-dibenz[d,g]-1,3,2-dioxaphosphocine, 2,2'2''-nitrilo[triethyltris(3,3'',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Particularly preferred phosphites/phosphonites are:

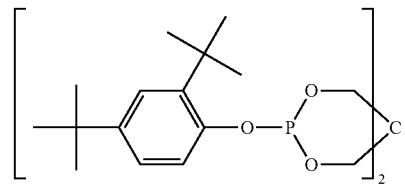

-continued
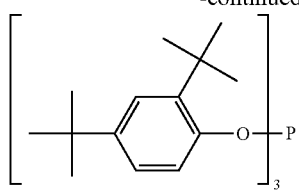
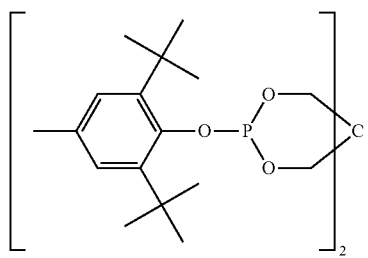
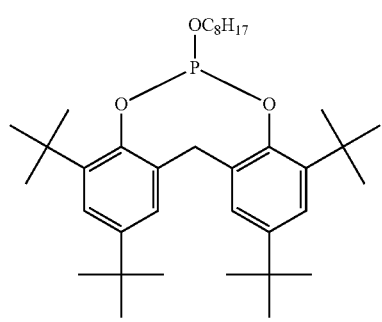
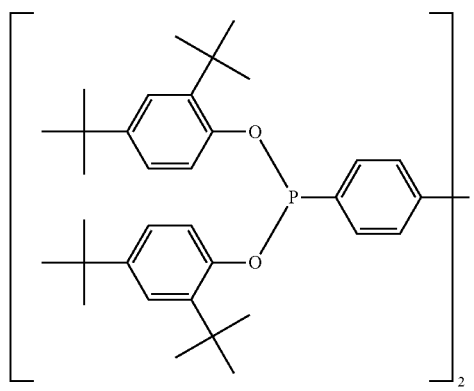
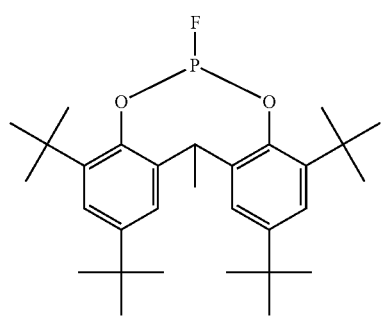
-continued
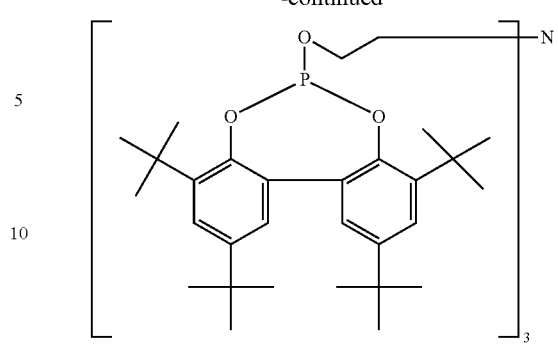
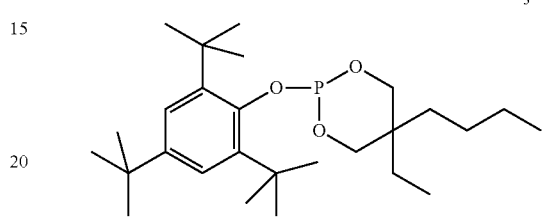
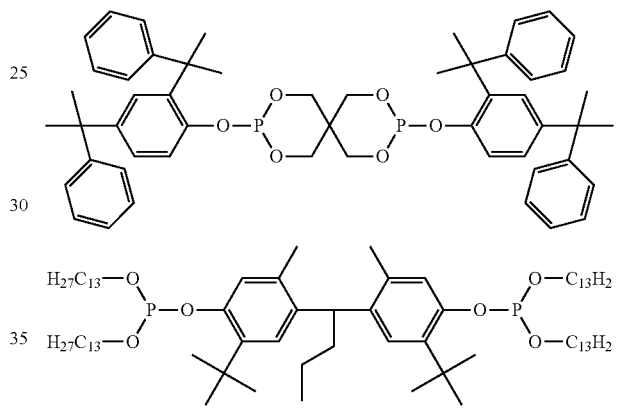
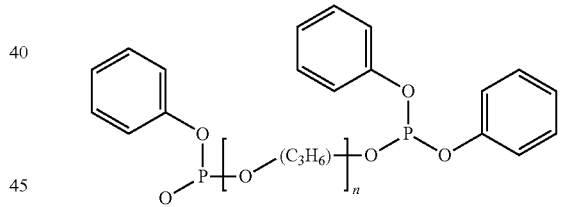
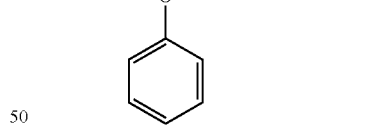
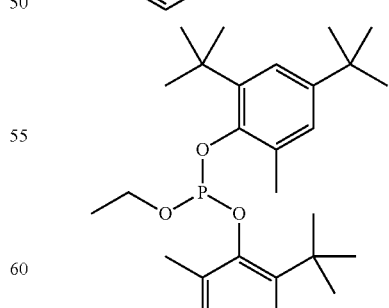
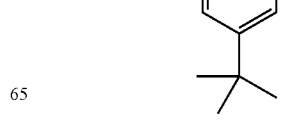

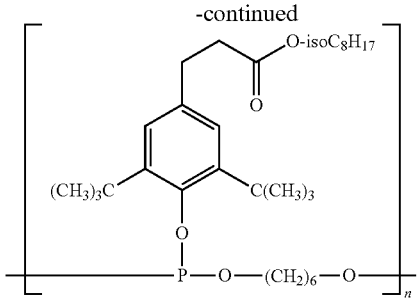

The phosphite tris-(2,4-d-tert-butylphenyl)phosphite is particularly preferably used as the secondary antioxidant.

Preferred sulfur compounds are:
distearylthiodipropionate, dilaurylthiodipropionate; ditridecyldithiopropionate, ditetradecylthiodipropionate, 3-(dodecylthio)-1,1'-[2,2-bis[[3-(dodecylthio)-1-oxopropoxy]methyl]-1,3-propandiyl]propanoic acid ester.

In a further preferred embodiment, component (B) comprises both a primary antioxidant and a secondary antioxidant. It is particularly preferred in this case that component (B) comprises a phenolic antioxidant and a phosphite or phosphonite.

In a further preferred embodiment, components (A) and (B) comprise a sustainable raw material.

In accordance with a further preferred variant of the method in accordance with the invention, the at least one alditol has the molecular formula $HOCH_2[CH(OH)]_nCH_2OH$, $R_1—OCH_2[CH(OH)]_nCH_2OH$, or $HOCH_2[CH(OH)]_n[CH(OR_1)]CH_2OH$ where n=2-6, preferably n=3-5, where $R_1$ is an optionally substituted sugar residue.

The at least one alditol is preferably selected from the group comprising threitol, erythritol, galactol, mannitol, ribitol, sorbitol, xylitol, arabitol, isomaltol, lactitol, maltitol, altritol, iditol, maltotritol, and hydrated oligosaccharides and polysaccharides with polyol end groups and mixtures thereof. The at least one preferred alditol is particularly preferably selected from the group comprising erythritol, mannitol, isomaltol, maltitol, and mixtures thereof. The at least one alditol is very particularly preferably mannitol or erythritol. Maltitol can furthermore be present as a so-called syrup that is technically obtained by hydration of glucose and that also comprises, in addition to maltitol, sorbitol, hydrated oligosaccharides and polysaccharides with alditol end groups. The alditols can here be present in different optical isomers, e.g. in the D or L form or meso form.

Examples for heptitols and octitols are: meso-glycero-allo-heptitol, D-glycero-D-altro-heptitol, D-glycero-D-manno-heptitol, meso-glycero-gulo-heptitol, D-glycero-D-galacto-heptitol (perseitol), D-glycero-D-gluco-heptitol, L-glycero-D-gluco heptitol, D-erythro-L-galacto-octitol, D-threo-L-galacto-octitol.

The structures and freeze points of the preferred alditols can be seen from the following Table 1.

TABLE 1

| Name | Chemical structure | Freeze point [° C.] |
|---|---|---|
| Arabitol | | 103 |
| Erythritol | | 120-123 |
| Isomaltol (Palatinitol) | | 145-150 (Mixture) |
| Galactinol | | 185-188 |

TABLE 1-continued

| Name | Chemical structure | Freeze point [° C.] |
|---|---|---|
| Lactitol | | 146 |
| Maltitol | | 149-152 |
| Mannitol | | 166-168 |
| Ribitol | | 102 |
| Sorbitol | | 94-96 |
| Maltotritol | | 184 |
| Hydrated oligosaccharides and polysaccharides | | |

Alternatively or additionally to the above-named alditols, cyclitols, i.e. ring-shaped polyols, can be used in the method in accordance with the invention (or for the purposes of the plastic composition, the molding compound, or the molded part or the stabilizer composition in accordance with the invention).

The at least one cyclitol can in particular be selected from the group comprising inositol (myo, scyllo-, D-chiro-, L-chiro-, muco-, neo-, allo-, epi- and cis-inositol), 1,2,3,4-tetrahydroxycyclohexane, 1,2,3,4,5-pentahydroxycyclohexane, quercitol, viscumitol, bornesitol, conduritol, ononitol, pinitol, pinpollitol, quebrachitol, ciceritol, quinic acid, so shikimic acid, and valienol, with myo-inositol being preferred here.

For the purposes of the present invention, the alditols or cyclitols contained as component (B) will be understood with respect to their weight portions in total as component (B) so that the totality of the contained alditols and/or cyclitols is always to be understood in this respect.

A particularly preferred variant of the method in accordance with the invention is characterized in that at least one primary antioxidant and at least one secondary antioxidant are introduced into the halogen-free thermoplastic. This means that at least one primary antioxidant and at least one secondary antioxidant are used as component (A). In this manner, an even more effective stabilization of the halogen-free thermoplastic against oxidative, thermal, and/or actinic degradation can be achieved.

In a further preferred variant of the method in accordance with the invention, component (A) and component (B) are introduced into the halogen-free thermoplastic recyclate in a weight ratio of 5:95 to 95:5, preferably of 10:90 to 90:10, particularly preferably of 20:80 to 80:20.

If component (A) comprises both a primary antioxidant and a secondary antioxidant, the ratio between the primary antioxidant and the secondary antioxidant is preferably 90:10 to 10:90, particularly preferably 80:20 to 20:80, and very particularly preferably 70:30 to 30:70.

A further preferred variant of the method in accordance with the invention is characterized in that components (A) and (B) are introduced into the halogen-free thermoplastic recyclate such that
components (A) and (B) present as solids are mixed with the halogen-free thermoplastic recyclate present as a solid and the mixture thereby produced is melted and subsequently cooled; or
components (A) and (B) present as solids are melted and the melt thus produced is introduced into a melt of the halogen-free thermoplastic recyclate.

Components (A) and (B), that can be present as a powder, compacted, as pellets, a solution, or flakes, are preferably mixed with the polymer to be stabilized, the polymer matrix is transferred to the melt and is subsequently cooled. Alternatively to this, it is equally possible to introduce the additive into a polymer melt in a molten state.

For the case that further components are added to the halogen-free thermoplastic recyclate, they can be admixed to the polymers separately, in the form of liquids, powders, pellets, or compacted products, or together with the additive composition in accordance with the invention as described above.

At least one additive can preferably additionally be introduced into the halogen-free thermoplastic recyclate that is selected from the group comprising UV absorbers, light stabilizers, metal deactivators, filler deactivators, antiozonants, nucleation agents, anti-nucleation agents, toughening agents, plasticizers, mold lubricants, rheological modifiers, thixotropic agents, chain extenders, optical brighteners, antimicrobial active agents, antistatic agents, slip agents, antiblocking means, coupling means, crosslinking means, anti-cross-linking means, hydrophilization agents, hydrophobing agents, bonding agents, dispersing agents, compatibilizers, oxygen captors, acid captors, expanding agents, degradation additives, defoaming agents, odor captors, marking agents, anti-fogging agents, fillers, reinforcement materials, and mixtures thereof.

It is further preferred that at least one additive is additionally introduced into the halogen-free thermoplastic recyclate that is selected from the group comprising
a) acid captors, preferably calcium stearate, magnesium stearate, zinc stearate, aluminum stearate, calcium stearate, calcium lactate, calcium stearoyl-2-lactate, hydrotalcite, in particular synthetic hydrotalcites on a basis of aluminum, magnesium, and zinc, hydrocalumites, zeolites, alkaline earth oxides, in particular calcium oxide and magnesium oxide, alkaline earth carbonates, in particular calcium carbonate, magnesium carbonate, and dolomite, and hydroxides, in particular brucite,
b) light stabilizers, preferably light stabilizers from the group of hindered amines,
c) dispersing agents,
d) filler deactivators, and
mixtures thereof.

Suitable light stabilizers are, for example, compounds based on 2-(2'-hydroxyphenyl)benzotriazoles, 2-hydroxy benzophenones, esters of benzoic acids, acrylates, oxamides, and 2-(2-hydroxyphenyl)-1,3,5-triazines.

Suitable 2-(2"-hydroxyphenyl)benzotriazoles are, for example, 2-(2'-hydroxy-5'methylphenyl)benzotriazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-di-tert-butyl-2'-hydroxyphenyl) chlorobenzotriazole, 2-(3'-tert-butyl-2'-hydroxy-5'-methylphenyl-5-chlorobenzotriazole, 2-(3'-sec-butyl-5'-tert-butyl-2'-hydroxy-phenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-di methyl benzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the product of the transesterification of 2-[3'-tert-butyl-5'-(2-methoxycarbonylethyl)-2'-hydroxyphenyl]-2H-benzotriazole with polyethylene glycol 300; [R—$CH_2CH_2$—COO—$CH_2CH_2$—]$_2$, where R=3'-tert-butyl-4'-hydroxy-5'-2H-benzotriazole-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl]benzotriazole.

Suitable 2-hydroxybenzophenones are, for example, 4-hydroxy-, 4-methoxy-, 4-octyloxy-, 4-decyloxy-4-dodecyloxy, 4-benzyloxy, 4,2',4'-tri hydroxy- and 2'-hydroxy-4,4'-dimethyoxy derivatives of the 2-hydroxy benzophenones.

Suitable acrylates are, for example, ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-(β-carbomethoxy-β-cyanovinyl)-2-methylindoline.

Suitable esters of benzoic acids are, for example, 4-tert-butylphenyl salicylate, phenylsalicylate, octylphenylsalicylate, dibenzoyl resorcinol, bis(4-tert-butylbenzoyl)resorcinol, benzoyl resorcinol, 2,4-di-tert-butylphenyl-3,5-di-tert-butyl hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixtures with 2-ethoxy-2'-ethyl-5,5'-di-tert-butoxanilide, mixtures of n- and p-methoxy-disubstituted oxanilides and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy)phenyl-4,6-di phenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are, for example, N,N'-diphenyloxamide, N-salicylal-N'-salicyloylhydrazine, N,N'-bis(salicyloyl)hydrazine, N,N'-bis(3,5-di-tert-butyl hydroxyphenylpropionyl)hydrazine, 3-salicyloylamino-1,2,4-triazole, bis(benzylidene)oxalyldihydrazide, oxanilide, isophthaloyldihydrazide, sebacoyl-bis-phenylhydrazide, N,N'-diacetyladipoyldihydrazide, N,N'-bis(salicyloyl)oxylyldihydrazide, N,N'-bis(salicyloyl)thiopropionyldihydrazide.

Suitable hindered amines are, for example, 1,1-bis(2,2,6,6-tetramethyl-4-piperidyl)succinate, bis(1,2,2,6,6-pentamethyl-4-piperidyl)sebazate, bis(1-octyloxy-2,2,6,6-tetramethyl piperidyl)sebazate, 1-cyclohexyloxy-2,2,6,6-tetramethyl-4-octadecylaminopiperidine, bis(1-acyl-2,2,6,6-tetramethylpiperidine-4-yl)sebazate 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-octyloxy-2,2,6,6-tetramethylpiperidyl)succinate, N,N'-bis-formyl-N,N'-bis(2,2,6,6-tetramethyl-4-piperidyl)hexamethylendiamine, (33a)bis(1-undecanyloxy-2,2,6,6-tetramethylpiperidine-4-yl)carbonate, 1,2,2,6,6-pentamethyl-4-aminopiperidines, 2-undecyl-7,7,9,9-tetramethyl-1-oxa-3,8-diaza-4-oxo-spiro[4,5]decanes-tris(2,2,6,6-tetramethyl-4-piperidyl)nitrilotriacetate 1,1'-(1,2-ethanediyl)-bis(3,3,5,5-tetramethylpiperazinone), 3-n-octyl-7,7,9,9-tetramethyl-1,3,8-triazaspiro[4.5]decane-2,4-diones, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-penta methyl-4-piperidyl)pyrrolidine-2,5-dione, bis(1,2,2,6,6-pentamethyl-4-piperidyl)-n-butyl-3,5-di-tert-butyl-4-hydroxybenzylmalonate, the condensation product from 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylendiamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro-[4,5]decane and epichlorhydrine.

The sterically hindered N—H, N-alkyl such as N-methyl or N-octyl, the N-alkoxy derivatives such as N-methoxy or N-octyloxy, the cycloalkyl derivatives such as N-cyclohexyloxy and the N-(2-hydroxy-2-methylpropoxy) analogs are also each included in the above-given structures here.

Preferred hindered amines furthermore have the following structures:

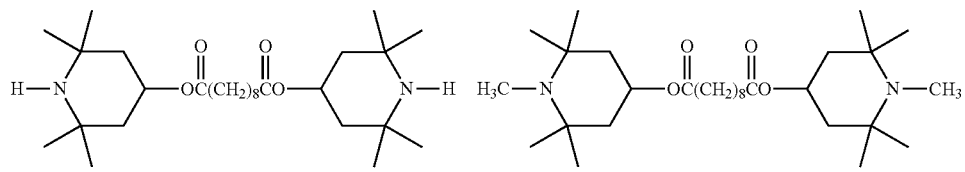

I 23 24
-continued
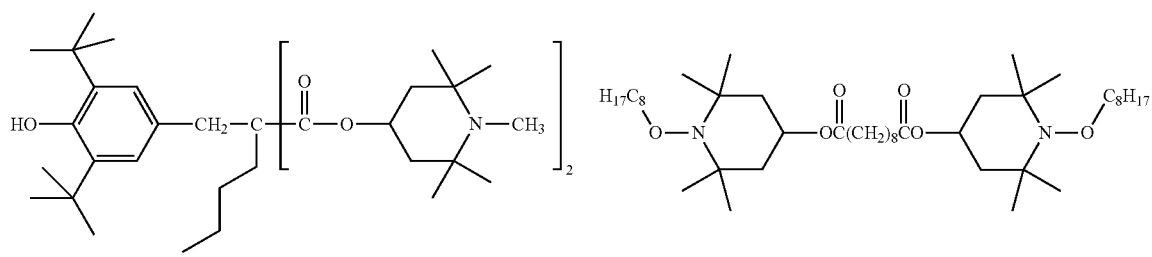
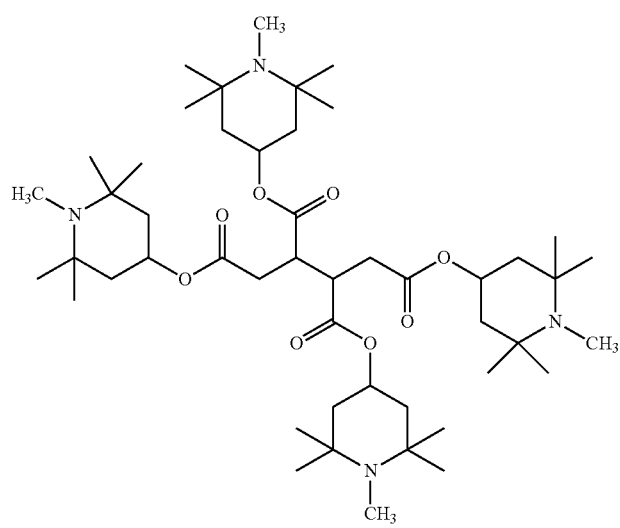
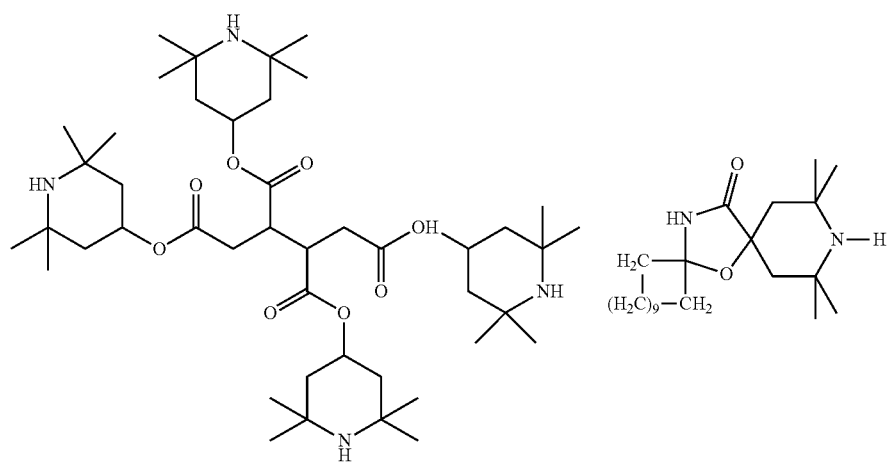
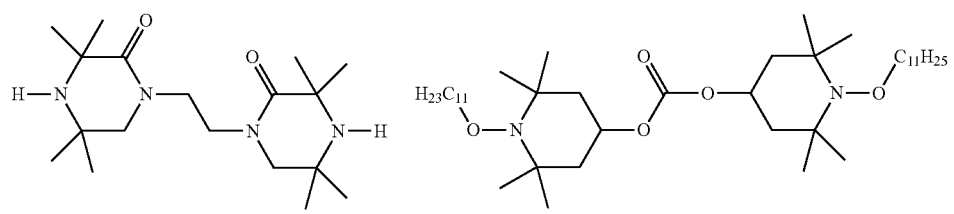

-continued
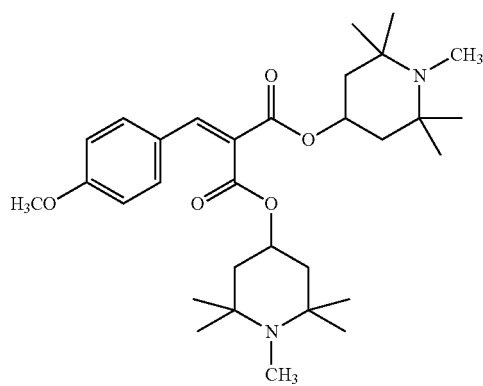
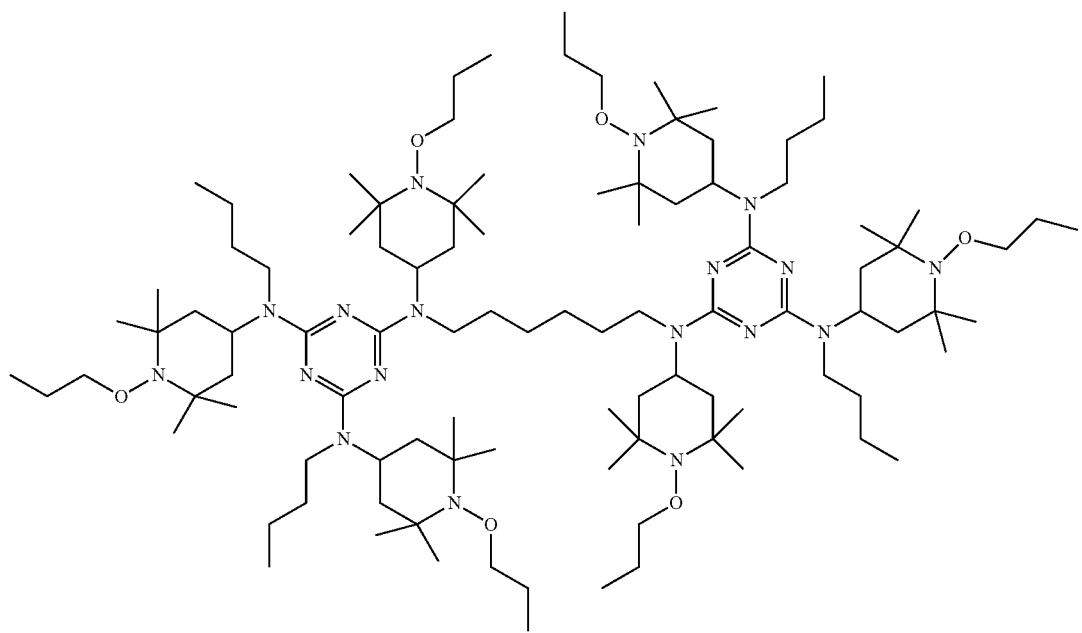
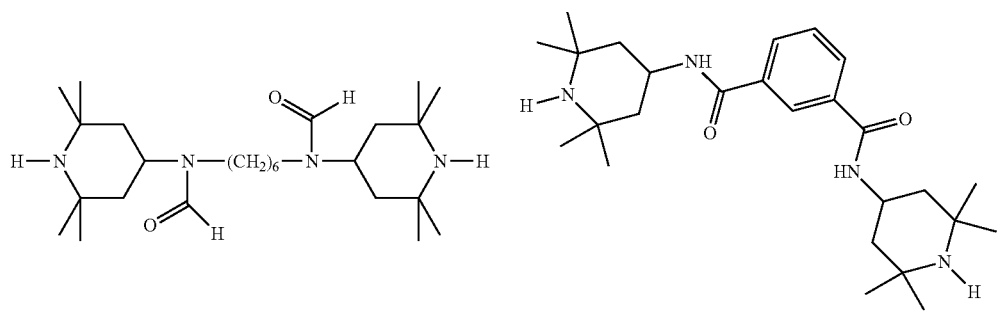

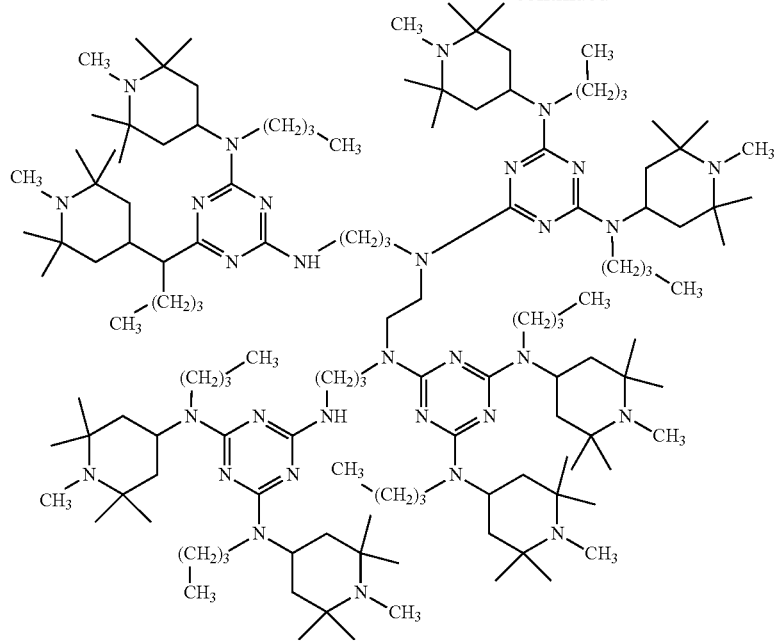
Preferred oligomeric and polymeric hindered amines have the following structures:
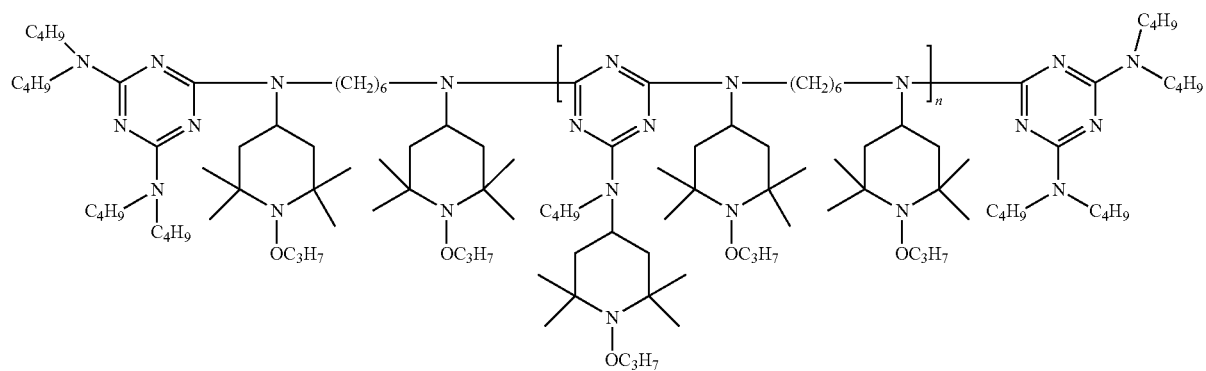
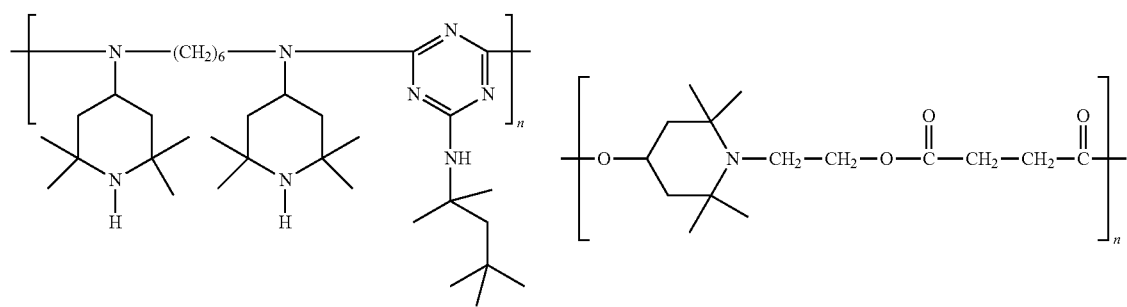

-continued
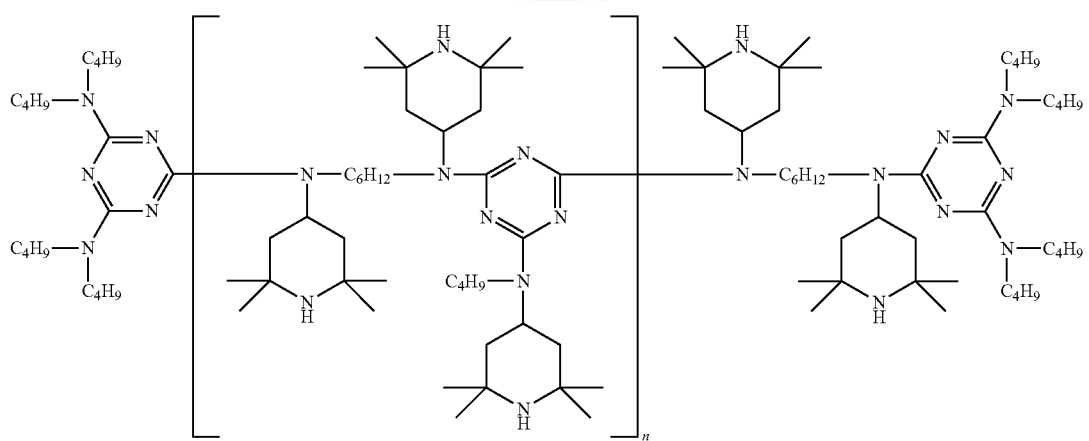
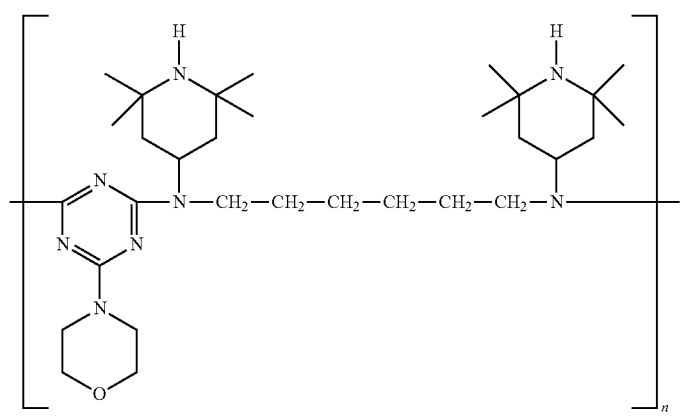
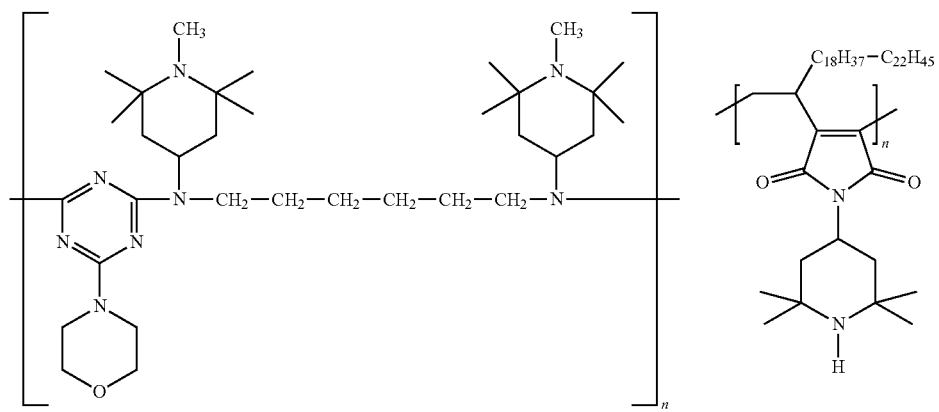

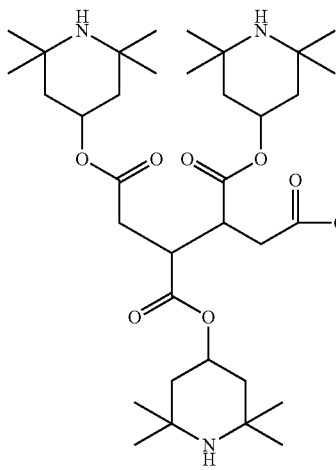
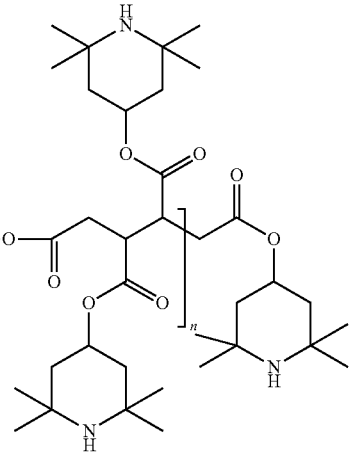
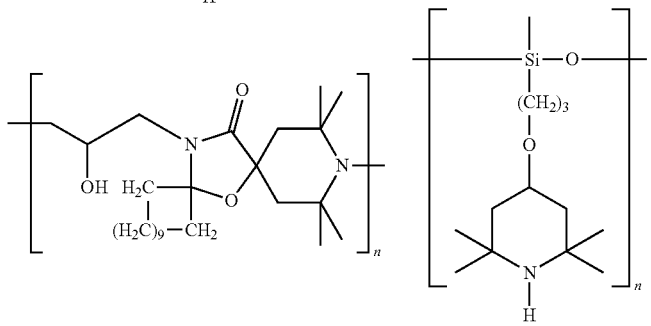

In the above-named compounds, n respectively means 3 to 100.

Suitable dispersion agents are, for example:

polyacrylates, e.g. copolymers with long-chain side groups, polyacrylate block copolymers, so alkylamides: e.g. N,N'-1,2-ethanediylbisoctadecanamide sorbitan ester, e.g. monostearylsorbitan esters, titanates and zirconates, reactive copolymers having functional groups, e.g. polypropylene-co-acrylic acid, polypropylene-co-maleic acid anhydride, polyethylene-co-glycidylmethacrylate, polystyrene-alt-maleic acid anhydride-polysiloxanes: e.g. dimethylsilandiole-ethylene-oxide copolymer, polyphenylsiloxane copolymer, amphiphilic copolymers: e.g. polyethylene-block-polyethylene oxide, dendrimers, e.g. dendrimers containing hydroxyl groups.

Suitable nucleation agents are, for example, talcum, alkali or alkaline earth salts of monofunctional and polyfunctional carboxylic acids such as benzoic acid, succinic acid, adipic acid, e.g. sodium benzoate, zink glycerolate, aluminum hydroxy-bis(4-tert-butyl)benzoate, benzylidene sorbitols such as 1,3:2,4-bis(benzylidene)sorbitol, 1,3:2,4-bis(4-methylbenzylidene)sorbitol, 2,2'-methylene-bis-(4,6-di-tert-butylphenyl)phosphate, and trisamides and diamides such as trimesic acid tricyclohexylami, trimesic acid tri(4-methyl-cyclo-hexylamide), trimesic acid tri(tert.butylamide), N,N',N''-1,3,5-benzoltriyltris(2,2-dimethyl-propanamide) or 2,6-naphthalindicarboxylic acid-cyclohexylamide.

Suitable antinucleation agents are, for example, azine dyes such as nigrosine, ionic liquids and/or lithium salts.

Suitable flame retardant agents are, for example:
a) Inorganic flame retardant agents such as Al(OH)$_3$, Mg(OH)$_2$, AlO(OH), MgCO$_3$, sheet silicates such as montmorillonite or sepiolite, unmodified or organically modified, double salts such as Mg—Al-silicates, POSS (polyhedral oligomeric silsesquioxane) compounds, huntite, hydromagnesite or halloysite and Sb$_2$O$_3$, Sb$_2$O$_5$, MoO3, zinc stannate, zinc hydroxystannate,
b) flame retardants containing nitrogen such as melamine, melem, melam, melon, melamine derivatives, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine metal phosphates such as melamine aluminum phosphate, melamine zinc phosphate, melamine magnesium phosphate, and the corresponding pyrophosphates and polyphosphates, poly-[2,4-(piperazine-1,4-yl)-6-(morpholine-4-yl)-1,3,5-triazine], ammonium polyphosphate, melamine borate, melamine hydrobromide,
c) radical formers such as alkoxyamines, hydroxylamine esters, azo compounds, sulfene amides, sulfene imides, dicumyl or polycumyl, hydroxyimides and their derivatives such as hydroxyimide esters or hydroxyimide ethers,
d) Flame retardants containing phosphorus such as red phosphorus, phosphates such as resorcin diphosphate, bisphenol-A-diphosphate, and their oligomers, triphenylphosphate, ethylene diamine diphosphate, phosphinates such as salts of the hypophosphorous acid and their derivatives such as alkylphosphinate salts, e.g. diethylphosphinate aluminum or diethylphosphinate-zinc or aluminum phosphinate, aluminum phosphite, aluminum phosphonate, phosphonate esters, oligomer and polymer derivatives of the methane phosphonic acid, 9,10-dihydro-9-oxa-10-phosphorylphenanthrene-10-oxide (DOPO) and their substituted compounds, e) halogenated flame retardants based on chlorine and bromine such as polybrominated diphenyl oxides such as decabromodiphenyloxide, tris(3-bromo-2,2-bis(bromomethyl)propyl-phosphate, tris(tribromoneopentyl) phosphate, tetrabromophthalic acid, 1,2-bis(tribromophenoxy)ethane, hexabromocyclododecane, brominated diphenylethane, tris-(2,3-dibrompropyl) isocyanurate, ethylene-bis-(tetrabromophthalimide), tetrabromo-bisphenol A, brominated polystyrene, brominated polybutadiene or polystyrene brominatd polybutadiene copolymers, brominated polyphenylene ether, brominated epoxy resin, polypentabromobenzylacrylate, optionally in combination with $Sb_2O_3$ and/or $Sb_2O_5$, f) borates such as zinc borate or calcium borate, optionally on a carrier material such as silica.

g) Compounds containing sulfur such as elemental sulfur, disulfides and polysulfides, thiuram sulfide, dithiocarbamates, mercaptobenzthiazole and sulfene amides.

h) anti-drip agents such as polytetrafluoroethylene, i) compounds containing silicon such as polyphenylsiloxanes, j) carbon modifications such as carbon nanotubes (CNTs), expanded graphite, or graphene, k) and combinations or mixtures thereof.

Suitable fillers and reinforcements are, for example, synthetic or natural material such as calcium carbonate, silicates, glass fibers, glass spheres (solid or hollow), talcum, mica, kaolin, barium sulfate, metal oxides and metal hydroxides, black carbon, graphite, carbon nanotubes, graphene, wood flour, or fibers of natural products such as cellulose or synthetic fibers. Further suitable fillers include hydrotalcites or zeolites or phyllosilicates such as montmorillonite, bentonite, beidellite, mica, hectorite, saponite, vermiculite, ledikite, magadite, illite, kaolinite, wollastonite, attapulgite.

Suitable pigments can be of an inorganic or organic nature. Inorganic pigments are, for example, titanium dioxide, zinc oxide, zinc sulfide, iron oxide, ultramarine, black carbon; organic pigments are, for example, anthraquinones, anthanthrones, benzimidazolones, chinacridones, diketoptyrrolopyrrols, dioxazines, inanthrones, isoindolines, azo compounds, perylenes, phthalocyanines or pyranthrones. Further suitable pigments include effect pigments on a metal base or pearl gloss pigments on a metal oxide base.

Suitable chain extenders for the linear molecular weight structure of polycondensation polymers such as polyesters or polyamides are, for example, diepoxides, bis-oxazonlines, bis-oxazolones, bis-oxazines, diisoscyanates, dianhydrides, bis-acyllactams, bis-maleimides, dicyanates, carbodiimides. Further suitable chain extenders include polymer compounds such as polystyrene polyacrylate polyglycidyl (meth)acrylate copolymers, polystyrene maleic acid anhydride copolymers, and polyethylene maleic acid anhydride copolymers.

Suitable optical brighteners are, for example, bis-benzoxazoles, phenylcumarines, or bis(styryl)biphenyls and in particular optical brighteners of the formulas:

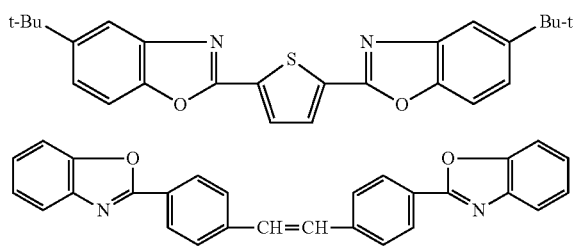

Suitable filler deactivators are, for example, polysiloxanes, polyacrylates, in particular block copolymers such as polymethacrylic acid polyalkyene oxide or polyglycidyl (meth)acrylates and their copolymers, e.g. with styrene and epoxides of e.g. the following structures:

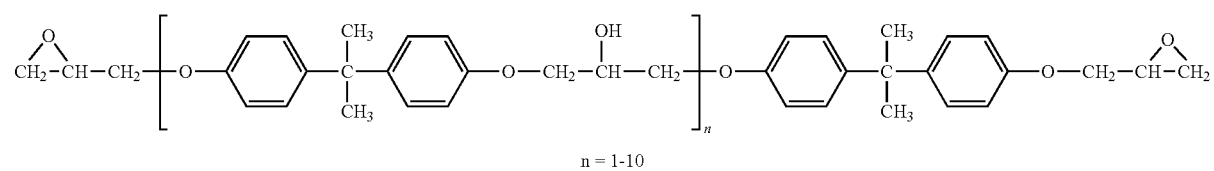

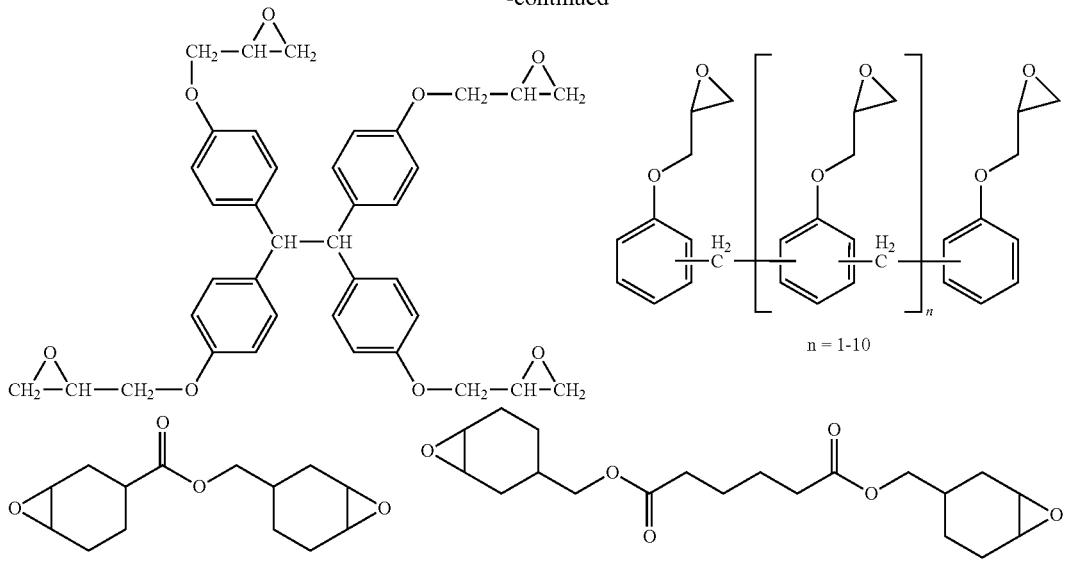

Suitable antistatic agents are, for example, ethoxylated alkylamines, fatty acid esters, alkylsulfonates, and polymers such as polyetheramides.

Suitable antiozonants include the above-named amines such as N,N'-di-isopropyl-p-phenylene diamine, N,N'-di-sec-butyl-p-phenylene diamine, N,N'-bis(1,4-dimethylpentyl)-p-phenylene diamine, N,N'-dicyclohexyl-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine.

Suitable demolding aids are, for example, montan waxes.

The working in of components (A) and (B) and optionally of the additional additives into the plastic recyclate takes place by typical processing methods, with the polymers being melted and being mixed with the additive composition in accordance with the invention and the optionally further additives, preferably by mixers, kneaders and extruders. Extruders such as single-screw extruders, twin screw extruders, planetary gear extruders, ring extruders, and co-kneaders that are preferably equipped with a vacuum degassing are preferred as processing machines. The processing can here take place under air or optionally under inert gas conditions such as under nitrogen.

Components (A) and (B) can furthermore be manufactured and introduced in the form of so-called master batches or concentrates that, for example, comprise 10-90% of a stabilizer composition comprising components (A) and (B) in a polymer.

It is further preferred that the halogen-free thermoplastic recyclate is selected from the group comprising
a) recycled polymers of olefins or diolefins such as polyethylene, in particular LDPE, LLDPE, VLDPE, ULDPE, MDE, HDPE, and UHMWPE, metallocene PE (m-PE), polypropylene, polyisobutylene, poly-4-methyl-pentene-1, polybutadiene, polyisoprene, polycyclooctene, polyalkylene-carbon monoxide copolymers, and corresponding copolymers in the form of statistical or block structures such as polypropylene-polyethylene (EP), EPM or EPDM, ethylene-vinyl acetate (EVA), ethylene-acrylic ester such as ethylene butyl acrylate, ethylene-acrylic acid glycidyl acrylate, and corresponding graft polymers such as polypropylene-g-maleic acid anhydride, polypropylene-g-acrylic acid, and polyethylene-g-acrylic acid,
b) recycled polystyrene, polymethyl styrene, polyvinyl naphthaline, styrene butadiene (SB), styrene butadiene styrene (SBS), styrene ethylene butylene styrene (SEBS), styrene ethylene propylene styrene, styrene isoprene, styrene isoprene styrene (SIS), styrene butadiene acrylonitrile (ABS), styrene acrylonitrile acrylate (ASA), styrene ethylene, styrene maleic acid anhydride polymers, including corresponding graft copolymers such as styrene on butadiene, maleic acid anhydride on SBS or SEBS, and graft copolymers of methyl methacrylate, styrene butadiene, and ABS (MABS),
c) recycled polymers of unsaturated esters such as polyacrylates and polymethacrylates such as polymethyl methacrylate (PMMA), polybutyl acrylate, polylauryl acrylate, polystearyl acrylate, polyacrylonitrile, polyacrylamides, and corresponding copolymers such as polyacrylonitrile-poly alkyl acrylate,
d) recycled polymers of unsaturated alcohols and derivatives such as polyvinyl alcohol, polyvinyl acetate, polyvinyl butyral,
e) recycled polyacetals such as polyoxymethylene (POM), and corresponding copolymers such as copolymers with butanal,
f) recycled polyphenylene oxides and blends thereof with polystyrene or polyamides,
g) recycled polymers of cyclic ethers such as polyethylene glycol, polypropylene glycol, polyethylene oxide, polypropylene oxide,
h) recycled polyurethanes of hydroxy terminated polyethers or polyesters and aromatic or aliphatic isocynates, in particular linear polyurethanes, polyureas,
i) recycled polyamides such as polyamide-6, 6.6, 6.10, 4.6, 4.10, 6.12, 12.12, polyamide 11, polyamide 12 and (semi-)aromatic polyamides such as polyphthalamides, e.g. manufactured from terepththalic acid and/or isophthalic acid and aliphatic diamines or from aliphatic dicarboxylic acids such as adipic acid or sebacic acid and aromatic diamines such as 1,4- or 1,3-diaminobenzol, j) recycled polyimides, polyamide imides, polyether imides, polyester imides, poly(ether)ketones, polysulfones, polyether sulfones, polyaryl sulfones, polyphenylene sulfide, polybenzimidazoles, polyhydantoins, k) recycled polyesters of aliphatic or aromatic dicarboxylic acids and diols or of hydroxy carboxylic acids such as polyethylene terephtha late (PET), polybutylene terephthalate (PBT), polypropylene terephthalate, polyethylene naphthylate, poly-1,4-dimethylocyclohexane terephthalate, polyhydroxy benzoate, polyhydroxy naphthalate, polylactic acid, l) recycled polycarbonates, polyester carbonates, and blends thereof such as PC/ABS, PC/PBT, PC/PET/PBT, m) recycled cellulose derivatives such as cellulose nitrate, cellulose acetate, cellulose propionate, cellulose butyrate, n) and mixtures, combinations, or blends of two or more of the above-named polymers.

The halogen-free thermoplastic recyclate is particularly preferably selected from the group comprising polymers of olefins or diolefins such as polyethylene, in particular LDPE, LLDPE, VLDPE, ULDPE, MDE, HDPE, and UHMWPE, metallocene PE (m-PE), polypropylene, polyisobutylene, poly-4-methyl-pentene-1, polybutadiene, polyisoprene, polycyclooctene, polyalkylene-carbon monoxide copolymers, and corresponding copolymers in the form of statistical or block structures such as polypropylene-polyethylene (EP), EPM or EPDM, ethylene-vinyl acetate (EVA), ethylene-acrylic ester such as ethylene butyl acrylate, ethylene-acrylic acid glycidyl acrylate, and corresponding graft polymers such as polypropylene-g-maleic acid anhydride, polypropylene-g-acrylic acid, and polyethylene-g-acrylic acid.

The halogen-free thermoplastic is very particularly preferably a polyolefin recyclate. The halogen-free thermoplastic recyclate can, for example, be polypropylene, that is in particular a polypropylene recyclate or polyethylene, that is in particular a polyethylene recyclate.

0.01 to 5 parts by weight, preferably 0.02 to 1 parts by weight, of an alditol or cyclitol are preferably introduced into 95-99.99, preferably into 99-99.98, parts of a halogen-free thermoplastic recyclate in the method in accordance with the invention.

(A) 0.02 to 3 parts by weight, preferably 0.03 to 0.5 parts by weight, of at least one alditol and/or of at least one cyclitol, and (B) 0.04 to 6 parts by weight, preferably 0.06 to 1 parts by weight, of at least one primary antioxidant and/or of at least one secondary antioxidant, are furthermore preferably introduced into 91 to 99.94 parts by weight, preferably 98.5 to 99.91 parts by weight, of at least one halogen-free thermoplastic recyclate in the method in accordance with the invention.

It is further preferred that (A) 0.02 to 3 parts by weight, preferably 0.03 to 0.5 parts by weight, of at least one alditol and/or of at least one cyclitol;

(B1) 0.02 to 3 parts by weight, preferably 0.03 to 0.5 parts by weight, of at least one primary antioxidant;

(B2) 0.02 to 3 parts by weight, preferably 0.03 to 0.5 parts by weight, of at least one secondary antioxidant;

are introduced into 91 to 99.94 parts by weight, preferably 98.5 to 99.91 parts by weight, of at least one halogen-free thermoplastic recyclate.

The present invention further relates to a plastic composition comprising or consisting of (A) at least one alditol and/or at least one cyclitol (component (A)); and (B) at least one halogen-free thermoplastic recyclate.

In this case—with the exception of the primary and/or secondary antioxidants optionally already contained in the recyclate—no further primary and/or secondary (fresh) antioxidants are admixed with the plastic composition.

The primary and/or secondary antioxidants contained in the recyclate and their degradation products can, where required, be determined by conventional analytical methods familiar to the skilled person, e.g. by chromatographic methods such as HPLC, optionally after extraction from the polymers by means of a suitable solvent and subsequent concentration by removal of the solvent.

The present invention additionally also relates to a plastic composition comprising or consisting of (A) at least one alditol and/or at least one cyclitol;

(B) at least one primary antioxidant and/or at least one secondary antioxidant; and (C) at least one halogen-free thermoplastic recyclate.

In a preferred embodiment, the plastic composition is characterized in that the plastic composition comprises or consists of (A) 0.02 to 3 parts by weight, preferably 0.03 to 0.5 parts by weight, of at least one alditol;

(B) 0.04 to 6 parts by weight, preferably 0.06 to 1 parts by weight, of at least one primary antioxidant and/or of at least one secondary antioxidant, and (C) 91 to 99.94 parts by weight, preferably 98.5 to 99.91 parts by weight, of at least one halogen-free thermoplastic recyclate.

The composition in accordance with the invention preferably comprises at least one primary antioxidant and at least one secondary antioxidant.

A further preferred embodiment is characterized in that the plastic composition comprises or consists of (A) 0.02 to 3 parts by weight, preferably 0.03 to 0.5 parts by weight, of at least one alditol and/or of at least one cyclitol;

(B1) 0.02 to 3 parts by weight, preferably 0.03 to 0.5 parts by weight, of at least one primary antioxidant;

(B2) 0.02 to 3 parts by weight, preferably 0.03 to 0.5 parts by weight, of at least one secondary antioxidant; and (C) 91 to 99.94 parts by weight, preferably 98.5 to 99.91 parts by weight, of at least one halogen-free thermoplastic recyclate.

In accordance with a further preferred embodiment, the plastic composition in accordance with the invention additionally comprises at least one additive that is selected from the group comprising UV absorbers, light stabilizers, metal deactivators, filler deactivators, antiozonants, nucleation agents, anti-nucleation agents, toughening agents, plasticizers, mold lubricants, rheological modifiers, thixotropic agents, chain extenders, optical brighteners, antimicrobial active agents, antistatic agents, slip agents, anti-blocking agents, coupling agents, crosslinking agents, anti-crosslinking agents, hydrophilization agents, hydrophobing agents, anchoring agents, dispersing agents, compatibilizers, oxygen captors, acid captors, expanding agents, degradation additives, defoaming agents, odor captors, marking agents, anti-fogging agents, fillers, reinforcement materials, and mixtures thereof.

It is further preferred that the plastic composition additionally comprises at least one additive that is selected from the group comprising a) acid captors, preferably calcium stearate, magnesium stearate, zinc stearate, aluminum stearate, calcium stearate, calcium lactate, calcium stearoyl-2-lactate, hydrotalcite, in particular synthetic hydrotalcites on a basis of aluminum, magnesium, and zinc, hydrocalumites, zeolites, alkaline earth oxides, in particular calcium oxide and magnesium oxide, zinc oxide, alkaline earth carbonates, in particular calcium carbonate, magnesium carbonate, and dolomite, and hydroxides, in particular brucite,
b) light stabilizers, preferably light stabilizers from the group of hindered amines,
c) dispersing agents,
d) filler deactivators, and mixtures thereof.

If only an alditol or cyclitol is added to the recyclate as a stabilizer, the further additive is in particular an acid captor in a preferred embodiment. Preferred acid captors are defined above.

The plastic composition in accordance with the invention can preferably be manufactured or has been manufactured using a method in accordance with the invention for stabilizing halogen-free thermoplastics against oxidative, thermal, and/or actinic degradation.

All the preferred variants, exemplary embodiments, and comments (e.g. with respect to possible components and additives to be used) described with respect to the method in accordance with the invention also apply accordingly to the plastic composition in accordance with the invention.

In accordance with a preferred embodiment of the plastic composition in accordance with the invention, the at least one primary antioxidant is selected from the group comprising phenolic antioxidants, amines, lactones, and mixtures thereof.

The phenolic antioxidant pentaerythritol-tetrakis[3-(3,5-di-tert-butyl-4-hydroxyphenyl)propionate is particularly preferably included as the primary antioxidant in the plastic composition in accordance with the invention.

A further preferred embodiment of the plastic composition in accordance with the invention is characterized in that the at least one secondary antioxidant is selected from the group comprising phosphorus compounds, in particular phosphites and phosphonites, organo-sulfur compounds, in particular sulfides and disulfides, and mixtures thereof.

The phosphite tris-(2,4-di-tert-butylphenyl)phosphite is particularly preferably included as the secondary antioxidant in the plastic composition in accordance with the invention.

In accordance with a further preferred embodiment, the at least one alditol has the molecular formula $$HOCH_2[CH(OH)]_nCH_2OH,$$

$$R_1-OCH_2[CH(OH)]_nCH_2OH, \text{ or}$$

$$HOCH_2[CH(OH)]_n[CH(OR_1)]CH_2OH$$

where n=2-6, preferably n=3-5, where $R_1$ is an optionally substituted sugar residue.

The at least one alditol is preferably selected from the group comprising threitol, erythritol, galactol, mannitol, ribitol, sorbitol, xylitol, arabitol, isomaltol, lactitol, maltitol maltotritol, and hydrated oligosaccharides and polysaccharides with polyol end groups and mixtures thereof. The at least one preferred alditol is particularly preferably selected from the group comprising erythritol, mannitol, isomaltol, maltitol, and mixtures thereof. The at least one alditol is very particularly preferably mannitol or the cyclitol is myo-inositol.

In a further preferred embodiment, component (A) and component (B) are included in the plastic composition in a weight ratio of 95:5 to 5:95, preferably of 90:10 to 9010, particularly preferably of 80:20 to 20:80.

It is further preferred that the halogen-free thermoplastic recyclate is selected from the group comprising
a) recycled polymers of olefins or diolefins such as polyethylene, in particular LDPE, LLDPE, VLDPE, ULDPE, MDE, HDPE, and UHMWPE, metallocene PE (m-PE), polypropylene, polyisobutylene, poly-4-methyl-pentene-1, polybutadiene, polyisoprene, polycyclooctene, polyalkylene-carbon monoxide copolymers, and corresponding copolymers in the form of statistical or block structures such as polypropylene-polyethylene (EP), EPM or EPDM, ethylene-vinyl acetate (EVA), ethylene-acrylic ester such as ethylene butyl acrylate, ethylene-acrylic acid glycidyl acrylate, and corresponding graft polymers such as polypropylene-g-maleic acid anhydride, polypropylene-g-acrylic acid, and polyethylene-g-acrylic acid,
b) recycled polystyrene, polymethyl styrene, polyvinyl naphthaline, styrene butadiene (SB), styrene butadiene styrene (SBS), styrene ethylene butylene styrene (SEBS), styrene ethylene propylene styrene, styrene isoprene, styrene isoprene styrene (SIS), styrene butadiene acrylonitrile (ABS), styrene acrylonitrile acrylate (ASA), styrene ethylene, styrene maleic acid anhydride polymers, including corresponding graft copolymers such as styrene on butadiene, maleic acid anhydride on SBS or SEBS, and graft copolymers of methyl methacrylate, styrene butadiene, and ABS (MABS),
c) recycled polymers of unsaturated esters such as polyacrylates and polymethacrylates such as polymethyl methacrylate (PMMA), polybutyl acrylate, polylauryl acrylate, polystearyl acrylate, polyacrylonitrile, polyacrylamides, and corresponding copolymers such as polyacrylonitrile-poly alkyl acrylate,
d) recycled polymers of unsaturated alcohols and derivatives such as polyvinyl alcohol, polyvinyl acetate, polyvinyl butyral,
e) recycled polyacetals such as polyoxymethylene (POM), and corresponding copolymers such as copolymers with butanal,
f) recycled polyphenylene oxides and blends thereof with polystyrene or polyamides,
g) recycled polymers of cyclic ethers such as polyethylene glycol, polypropylene glycol, polyethylene oxide, polypropylene oxide,
h) recycled polyurethanes of hydroxy terminated polyethers or polyesters and aromatic or aliphatic isocyanates, in particular linear polyurethanes, polyureas,
i) recycled polyamides such as polyamide-6, 6.6, 6.10, 4.6, 4.10, 6.12, 12.12, polyamide 11, polyamide 12 and (semi-)aromatic polyamides such as polyphthalamides, e.g. manufactured from terepththalic acid and/or isophthalic acid and aliphatic diamines or from aliphatic dicarboxylic acids such as adipic acid or sebacic acid and aromatic diamines such as 1,4- or 1,3-diaminobenzol,
j) recycled polyamides, polyamide imides, polyether imides, polyester imides, poly(ether)ketones, polysulfones, polyether sulfones, polyaryl sulfones, polyphenylene sulfide, polybenzimidazoles, polyhydantoins,
k) recycled polyesters of aliphatic or aromatic dicarboxylic acids and diols or of hydroxy carboxylic acids such as polyethylene terephthalate (PET), polybutylene terephthalate (PBT), polypropylene terephthalate, polyethylene naphthylate, poly-1,4-dimethylocyclohexane terephthalate, polyhydroxy benzoate, polyhydroxy naphthalate, polylactic acid, l) recycled polycarbonates, polyester carbonates, and blends thereof such as PC/ABS, PC/PBT, PC/PET/PBT, m) recycled cellulose derivatives such as cellulose nitrate, cellulose acetate, cellulose propionate, cellulose butyrate, n) and mixtures, combinations, or blends of two or more of the above-named polymers.

The halogen-free thermoplastic recyclate is particularly preferably selected from the group comprising polymers of olefins or diolefins such as polyethylene, in particular LDPE, LLDPE, VLDPE, ULDPE, MDE, HDPE, and UHMWPE, metallocene PE (m-PE), polypropylene, polyisobutylene, poly-4-methyl-pentene-1, polybutadiene, polyisoprene, polycyclooctene, polyalkylene-carbon monoxide copolymers, and corresponding copolymers in the form of statistical or block structures such as polypropylene-polyethylene (EP), EPM or EPDM, ethylene-vinyl acetate (EVA), ethylene-acrylic ester such as ethylene butyl acrylate, ethylene-acrylic acid glycidyl acrylate, and corresponding graft polymers such as polypropylene-g-maleic acid anhydride, polypropylene-g-acrylic acid, and polyethylene-g-acrylic acid.

The halogen-free thermoplastic recyclate is very particularly preferably a polyolefin, in particular a polyolefin recyclate. The halogen-free thermoplastic can, for example, be polypropylene, in particular a polypropylene recyclate.

The present invention also relates to a molding compound or to a molded part that can be manufactured from a plastic composition in accordance with the invention, in particular in the form of injection molded parts, foils, films, lacquers, coatings, foams, fibers, cables, tubes, sections, hollow bodies, ribbons, membranes, e.g. geo-membranes, lubricants, colorants, and/or adhesives that are manufactured by extrusion, injection molding, blow molding, calendering, pressing processes, spinning processes, and or rotomolding, e.g. for the electrical industry, for the construction industry, for the transport industry, for medical applications, for domestic and electric appliances, for vehicle parts, for consumer products, for packaging, for furniture, and/or for textiles.

The present invention further also relates to a stabilizer composition for stabilizing halogen-free thermoplastic recyclates, preferably halogen-free thermoplastic recyclates, against oxidative, thermal, and/or actinic degradation, comprising (A) at least one primary antioxidant and/or at least one secondary antioxidant; and (B) at least one alditol and/or at least one cyclitol.

All the preferred variants, exemplary embodiments, and comments (e.g. with respect to possible components and additives to be used) already described with respect to the method in accordance with the invention and with respect to the plastic composition in accordance with the invention also apply accordingly to the stabilizer composition in accordance with the invention.

In a preferred embodiment of the stabilizer composition in accordance with the invention, the at least one primary antioxidant is selected from the group comprising phenolic antioxidants, amines, lactones, and mixtures thereof.

Preferred phenolic antioxidants, preferred amines, and preferred lactones are each the same as those named in the method in accordance with the invention and in the plastic composition in accordance with the invention.

A further preferred embodiment of the stabilizer composition in accordance with the invention is characterized in that the at least one secondary antioxidant is selected from the group comprising phosphorus compounds, in particular phosphites and phosphonites, organo-sulfur compounds, in particular sulfides and disulfides, and mixtures thereof.

Preferred phosphites and phosphonites and preferred sulfur compounds are each the same as those named in the method in accordance with the invention and in the plastic composition in accordance with the invention.

In accordance with a further preferred embodiment, the at least one alditol has the molecular formula $HOCH_2[CH(OH)]_nCH_2OH,$ $R_1-OCH_2[CH(OH)]_nCH_2OH,$ or $HOCH_2[CH(OH)]_n[CH(OR_1)]CH_2OH$ where n=2-5, where $R_1$ is an optionally substituted sugar residue.

The at least one alditol is preferably selected from the group comprising threitol, erythritol, galactol, mannitol, ribitol, sorbitol, xylitol, arabitol, isomaltol, lactitol, maltitol, maltotritol, and hydrated oligosaccharides and polysaccharides with polyol end groups and mixtures thereof. The at least one preferred alditol is particularly preferably selected from the group comprising erythritol, mannitol, isomaltol, maltitol, and mixtures thereof. The at least one alditol is very particularly preferably mannitol or erythritol or the cyclitol is myo-inositol.

The present invention also relates to the use of at least one alditol and/or at least one cyclitol for stabilizing halogen-free thermoplastic recyclates against oxidative, thermal, and/or actinic degradation.

The present invention further relates to the use of the stabilizer composition in accordance with the invention or of a stabilizer composition comprising or consisting of (A) at least one alditol and/or at least one cyclitol;

(B) at least one primary antioxidant and/or at least one secondary antioxidant for stabilizing halogen-free thermoplastics, preferably halogen-free thermoplastic recyclates, against oxidative, thermal, and/or actinic degradation.

Preferred halogen-free thermoplastics are here the same as those named with respect to the method in accordance with the invention and to the plastic composition in accordance with the invention.

The stabilizer composition is particularly preferably used for stabilizing polyolefin recyclates and against oxidative, thermal, and/or actinic degradation.

All the preferred variants, exemplary embodiments, and comments (e.g. with respect to possible components and additives to be used) already described with respect to the method in accordance with the invention and with respect to the plastic composition in accordance with the invention and with respect to the stabilizer composition in accordance with the invention also apply accordingly to the use of a stabilizer composition in accordance with the invention.

The present invention will be looked at in more detail with reference to the following embodiments without restricting the invention to the specifically shown parameters.

To simulate a recyclate in the form of production waste, commercial polypropylene (Moplen HP 500N, Lyondell Basell Industries) was milled to a powder and was processed three times at a maximum temperature of 230° C. by means of a twin screw extruder of the type Process 11 (Fisher Scientific) at 200 r.p.m., cooled in a water bath, and subsequently pelletized. Pre-damage takes place by this process that correlates with a degradation of the polymer in the increase of the MVR (melt volume rate, measured at 230° C./2.16 kg) measured in accordance with ISO 1133. An increase of the MVR is measured here from 18.1 g/10 min (after the 1st extrusion) to 25.0 g/10 min (3rd extrusion). This increase represents clear pre-damage. This pre-damaged polypropylene was subsequently processed in the following 4th extrusion with the stabilizers set forth in Table 2 and the MVR was again determined. The pellets obtained were subsequently processed without further additives (5th extrusion).

It is found here that the non-stabilized polymer is still subject to a clear degradation. The degradation can be reduced by addition of a stabilizer combination of a commercial antioxidant and a phosphite (comparison example 2) or a special recyclate stabilizer (comparison example 3). The addition of an alditol (mannitol) to a phenolic antioxidant and a phosphite surprisingly produces an improved stabilization, i.e. the lowest MVR value. A further extrusion step also shows the best stabilization effect, i.e. the lowest MVR value by the composition in accordance with the invention.

TABLE 2

Post-stabilization of polypropylene

| | Post-stabilization | After 4th extrusion MVR (230/2.16) | After 5th extrusion MVR (230/2.16) |
|---|---|---|---|
| Comparison example 1 | Without additive | 29.5 | 34.6 |
| Comparison example 2 | 0.05% AO-1 + 0.05% P-1 | 23.2 | 25.4 |
| Comparison example 3 | 0.2% Recyclostab 411 | 23.0 | 24.4 |
| Example 1 in accordance with the invention | 0.05% AO-1 + 0.05% P-1 + 0.1% mannitol | 22.3 | 24.0 |

AO-1: Pentaerythritol-tetrakis[3-(3,5-di-tert-butyl-4-hydroxyphenyl)propionate
P-1: Tris-(2,4-di-tert-butylphenyl)phosphite Recyclostab 411: Recyclostab 411 is a commercial stabilizer system that is in particular recommended for polyolefin recyclates (manufacturer: PolyAd Services GmbH, Bensheim, see e.g. Compounding World, April 2016, 41-48).

In the following examples in accordance with the invention, the effect of different alditols/cyclitols is shown in combination with a primary and a secondary antioxidant in different concentrations and the effect in a post-consumer recyclate is shown.

Table 3: A polypropylene recyclate (pre-damaged, manufactured by aging Moplen HP 500 N (supplier: Lyondell-Basell) at 140° C. in a convection oven for 32 days is conveyed in a circle in the melt together with the additives shown in the table at 200° C. in a twin screw micro-extruder (MC 5, manufacturer DSM) in a continuous mode at 90 revolutions per minute for 30 minutes. The force absorption is measured in each case after 10, 20, and 30 minutes. The force is a measure for the toughness of the melt and thus for the molecular weight. The higher the remaining force (after a melting time of 2 minutes=100%), the smaller the degradation of the polymer and the better the stabilization effect.

TABLE 3

| | Post-stabilization | Remaining force in % after 10 minutes | Remaining force in % after 20 minutes | Remaining force in % after 30 minutes |
|---|---|---|---|---|
| Comparison example 4 | Without additive | 77 | 60 | 43 |
| Example 2 in accordance with the invention | 0.1% erythritol + 0.05% AO-1 + 0.05% P-1 | 85 | 74 | 62 |
| Example 3 in accordance with the invention | 0.2% erythritol + 0.05% AO-1 + 0.05% P-1 | 94 | 84 | 72 |
| Example 4 in accordance with the invention | 0.1% myo-inositol + 0.05% AO-1 + 0.05% P-1 | 88 | 78 | 68 |
| Example 5 in accordance with the invention | 0.1% isomaltol + 0.05% AO-1 + 0.05% P-1 | 82 | 67 | 55 |

The examples in accordance with the invention here have higher forces at all measurement times, i.e. a smaller degradation of the polymer than the comparison example.

Table 4: A post-consumer polypropylene recyclate from accumulator box ground stock (supplier: BSB Braubach) is conveyed in a circle in the melt together with the additives shown in the table at 215° C. in a twin screw micro-extruder (MC 5, manufacturer DSM) in a continuous mode at 90 revolutions per minute for 30 minutes. The force absorption is measured in each case after 10, 20, and 30 minutes. The force is a measure for the toughness of the melt and thus for the molecular weight. The higher the remaining force (after a melting time of 2 minutes=100%), the smaller the degradation of the polymer and the better the stabilization effect.

TABLE 4

| | Post-stabilization | Remaining force in % after 10 minutes | Remaining force in % after 20 minutes | Remaining force in % after 30 minutes |
|---|---|---|---|---|
| Comparison example 4 | Without additive | 70 | 47 | 27 |
| Comparison example 6 | 0.05% AO-1 + 0.05% P-1 + 0.3% AS-1 | 80 | 62 | 50 |
| Comparison example 7 | 0.1% AO-1 + 0.1% P-1 + 0.3% AS-1 | 86 | 71 | 58 |
| Comparison example 8 | 0.3% AS-1 | 78 | 55 | 35 |
| Example 6 in accordance with the invention | 0.1% erythritol + 0.05% AO-1 + 0.05% P-1 + 0.3% AS-1 | 96 | 73 | 65 |
| Example 7 in accordance with the invention | 0.2% erythritol + 0.05% AO-1 + 0.05% P-1 + 0.3% AS-1 | 96 | 88 | 67 |
| Example 8 in accordance with the invention | 0.1% myo-inositol + 0.05% AO-1 + 0.05% P-1 + 0.3% AS-1 | 90 | 78 | 69 |
| Example 9 in accordance with the invention | 0.1% isomaltol + 0.05% AO-1 + 0.05% P-1 + 0.3% AS-1 | 94 | 79 | 69 |

AS-1 = Hycite 713 (manufacturer: Clariant SE) is a hydrotalcite used as an acid captor.

The examples in accordance with the invention here have higher forces at all measurement times, i.e. a smaller degradation of the polymer than the comparison example.

In the following example (Table 5) in accordance with the invention, the stabilization of a recyclate by an alditol alone is shown analogously to the processing conditions of Table 3.

TABLE 5

| | Post-stabilization | Remaining force in % after 10 minutes | Remaining force in % after 20 minutes | Remaining force in % after 30 minutes |
|---|---|---|---|---|
| Comparison example 4 (from Table 3) | Without additive | 77 | 60 | 43 |
| Example 11 in accordance with the invention | 0.2% erythritol | 83 | 61 | 46 |

The examples in accordance with the invention here have higher forces at all measurement times, i.e. a smaller degradation of the polymer than the comparison example.

In the following example (Table 6) in accordance with the invention, the stabilization of a recyclate by an alditol without an antioxidant is shown analogously to the processing conditions of Table 4.

TABLE 6

| | Post-stabilization | Remaining force in % after 10 minutes | Remaining force in % after 20 minutes | Remaining force in % after 30 minutes |
|---|---|---|---|---|
| Comparison example 5 (from Table 4) | Without additive | 70 | 47 | 27 |
| Example 12 in accordance with the invention | 0.1% myo-inositol + 0.3% AS-1 | 82 | 69 | 57 |

The example in accordance with the invention here has higher forces at all measurement times, i.e. a smaller degradation of the polymer than the comparison example.

The post-consumer accumulator box recyclate was then extruded three times at a maximum temperature of 230° C. by means of a twin screw extruder of the type Process 11 (Fisher Scientific) at 200 r.p.m., cooled in a water bath, and subsequently pelletized, and the MVR was determined in each case after the 1st, 2nd, and 3rd extrusion (Table 7). The lower the MVR, the smaller the degradation of the polymer in the processing and the better the stabilization effect.

TABLE 7

| | Post-stabilization | After the 1st extrusion MVR (230/2.16) | After the 2nd extrusion MVR (230/2.16) | After the 3rd extrusion MVR (230/2.16) |
|---|---|---|---|---|
| Comparison example 6 | Without additive | 9.6 | 10.2 | 11.4 |
| Example 13 in accordance with the invention | 0.2% mannitol + 0.2% AS-1 | 9.2 | 9.3 | 9.2 |
| Example 14 in accordance with the invention | 0.1% mannitol + 0.1% tannin + 0.2% AS-1 | 8.4 | 8.8 | 8.5 |
| Example 15 in accordance with the invention | 0.2% mannitol + 0.2% tannin + 0.2% AS-1 | 8.2 | 8.4 | 8.5 |

The examples in accordance with the invention here have a smaller MVR value, i.e. a smaller degradation and thus an improved stability than the comparison example, after all extrusions.

In a further experimental series polypropylene recyclate (pre-damaged, manufactured by aging Moplen HP 500 N (supplier: Lyondell-Basell) at 140° C. in a convection oven for 32 days was conveyed in a circle in the melt together with the additives shown in the table at 200° C. in a twin screw micro-extruder (MC 5, manufacturer DSM) in a continuous mode at 90 revolutions per minute for 30 minutes and the percentage residual stability was determined with reference to the remaining force (Table 8). The force is a measure for the toughness of the melt and thus for the molecular weight. The higher the remaining force at the end of the experiment, the smaller the degradation of the polymer and the better the stabilization effect.

TABLE 8

| | Post-stabilization | Remaining force in N after 30 minutes |
|---|---|---|
| Comparison example 7 | 0.05% AO-1 + 0.05% P-1 | 310 |
| Comparison example 8 | 0.1% AO-1 + 0.1% P-1 | 390 |
| Comparison example 9 | 0.1% P-1 | 350 |
| Example 16 in accordance with the invention | 0.05% AO-1 + 0.05% P-1 + 0.05% mannitol | 520 |
| Example 17 in accordance with the invention | 0.05% AO-1 + 0.05% P-1 + 0.1% mannitol | 680 |
| Example 18 in accordance with the invention | 0.05% AO-1 + 0.05% P-1 + 0.2% mannitol | 640 |
| Example 19 in accordance with the invention | 0.1% AO-1 + 0.1% mannitol | 580 |
| Example 20 in accordance with the invention | 0.1% P-1 + 0.1% mannitol | 560 |
| Example 21 in accordance with the invention | 0.1% mannitol | 410 |
| Example 22 in accordance with the invention | 0.5% mannitol | 470 |

The examples in accordance with the invention here have a higher residual force i.e. a smaller degradation of the polymer than the comparison examples.

In an analogous manner to polypropylene recyclate, post-consumer polyethylene recyclates from packaging films, primarily comprising LDPE and LLDPE, polyethylene recyclates from hollow bodies, primarily comprising HDPE, polystyrene recyclates from packaging foams, polyamide-6-recyclates from electrical applications, and PET recyclates from beverage bottles were each provided with the additives in accordance with the invention and extruded. An improved stability in comparison with the recyclates without an additive can be found in all cases.

The invention claimed is:

1. A method for stabilizing a halogen-free thermoplastic recyclate against oxidative, thermal, and/or actinic degradation comprising introducing at least one alditol selected from isomaltol, lactitol, maltotriol, threitol, erythritol, galactol, mannitol, ribitol, xylitol, arabitol, hydrated oligosaccharides, and polysaccharides with polyol end groups, (component (A)), into the halogen-free thermoplastic recyclate, wherein the halogen-free thermoplastic recyclate is selected from a recycled polymer of an olefin, a diolefins, and a mixture thereof,
and further comprising introducing at least one primary antioxidant and/or at least one secondary antioxidant (component (B)) into the halogen-free thermoplastic recyclate.

2. The method of claim 1, wherein the at least one primary antioxidant is selected from phenolic antioxidants, amines, and lactones.

3. The method of claim 1, wherein the at least one secondary antioxidant is selected from phosphorus compounds and organo-sulfur compounds.

4. The method of claim 1, wherein the at least one alditol is selected from threitol, erythritol, galactol, mannitol, ribitol, xylitol, arabitol, hydrated oligosaccharides, and polysaccharides with polyol end groups.

5. The method of claim 1, wherein the at least one primary antioxidant and the at least one secondary antioxidant are introduced into the halogen-free thermoplastic recyclate.

6. The method of claim 1, wherein component (A) and component (B) are introduced into the halogen-free thermoplastic recyclate in a weight ratio of 95:5 to 5:95.

7. The method of claim 1, wherein components (A) and (B) are introduced into the halogen-free thermoplastic recyclate such that
- components (A) and (B) present as solids are mixed with the halogen-free thermoplastic recyclate present as a solid and the mixture thereby produced is melted and subsequently cooled; or
- components (A) and (B) present as solids are melted and the melt thus produced is introduced into a melt of the halogen-free thermoplastic recyclate.

8. The method of claim 1, wherein 0.01 to 5.0 parts by weight of the at least one alditol (component A) are introduced with respect to 95.0 to 99.99 parts by weight of the halogen-free thermoplastic recyclate.

9. The method of claim 1, wherein, with respect to 91 to 99.94 parts by weight of the halogen-free thermoplastic recyclate,
- (A) 0.02 to 3 parts by weight of the at least one alditol; and
- (B) 0.04 to 6 parts by weight of the at least one primary antioxidant and/or of the at least one secondary antioxidant are introduced.

10. The method of claim 1, wherein the recycled polymer of olefin or diolefin is selected from:
a) polyethylene, polypropylene, polyisobutylene, poly-4-methyl-pentene-1, polybutadiene, polyisoprene, polycyclooctene, polyalkylene-carbon monoxide copolymers, and corresponding copolymers in the form of statistical or block structures, ethylene-vinyl acetate (EVA), ethylene-acrylic ester polymers, polypropylene-g-maleic acid anhydride, polypropylene-g-acrylic acid, and polyethylene-g-acrylic acid, and
b) mixtures, combinations, and blends of two or more of the above-named polymers.

11. A plastic composition comprising at least one alditol, wherein the at least one alditol is selected from isomaltol, lactitol, maltotriol, threitol, erythritol, galactol, mannitol, ribitol, xylitol, arabitol, hydrated oligosaccharides, and polysaccharides with polyol end groups, (component (A)); at least one primary antioxidant and/or at least one secondary antioxidant (component (B)); and at least one halogen-free thermoplastic recyclate, wherein the halogen-free thermoplastic recyclate is selected from a recycled polymer of an olefin or diolefin.

12. The plastic composition of claim 11, wherein the plastic composition comprises
- (A) 0.01 to 5.0 parts by weight of the at least one alditol, and
- (B) 95.0 to 99.99 of the at least one halogen-free thermoplastic recyclate.

13. The plastic composition of claim 11, which comprises:
the at least one alditol (component (A));
the at least one primary antioxidant and/or at least one secondary antioxidant (Component (B)); and
the at least one halogen-free thermoplastic recyclate.

14. The plastic composition of claim 11, wherein the plastic composition comprises:
0.02 to 3 parts by weight of the at least one alditol,
0.04 to 6 parts by weight of the at least one primary antioxidant and/or of the at least one secondary antioxidant, and
91 to 99.94 parts by weight of the at least one halogen-free thermoplastic recyclate.

15. The plastic composition of claim 13, wherein the plastic composition comprises:
- (A) 0.02 to 3 parts by weight of the at least one alditol,
- (B1) 0.02 to 3 parts by weight of the at least one primary antioxidant,
- (B2) 0.02 to 3 parts by weight of the at least one secondary antioxidant, and
- (C) 91 to 99.94 parts by weight of the at least one halogen-free thermoplastic recyclate.

16. The plastic composition of claim 12, further comprising at least one additive selected from UV absorbers, light stabilizers, metal deactivators, filler deactivators, antiozonants, nucleation agents, anti-nucleation agents, toughening agents, plasticizers, mold lubricants, rheological modifiers, thixotropic agents, chain extenders, optical brighteners, antimicrobial active agents, antistatic agents, slip agents, antiblocking agents, coupling agents, crosslinking agents, anti-cross-linking agents, hydrophilization agents, hydrophobing agents, anchoring agents, dispersing agents, compatibilizers, oxygen scavengers, acid scavengers, expanding agents, degradation additives, defoaming agents, odor scavengers, marking agents, anti-fogging agents, fillers, and reinforcement materials.

17. The plastic composition of claim 12, which further comprises at least one additive selected from acid scavengers, light stabilizers, dispersing agents, and filler deactivators.

18. The plastic composition of claim 12, which is manufactured by a method which comprises stabilizing a halogen-free thermoplastic recyclate against oxidative, thermal, and/or actinic degradation comprising introducing the at least one alditol (component (A)) into the halogen-free thermoplastic recyclate.

19. A molding compound or a molded part manufactured from the plastic composition of claim 11.

* * * * *